(12) United States Patent
Gotoh

(10) Patent No.: US 11,262,582 B2
(45) Date of Patent: Mar. 1, 2022

(54) DISPLAY DEVICE AND MOBILE OBJECT

(71) Applicant: Tokiko Gotoh, Kanagawa (JP)

(72) Inventor: Tokiko Gotoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 155 days.

(21) Appl. No.: 16/659,576

(22) Filed: Oct. 22, 2019

(65) Prior Publication Data

US 2020/0166751 A1 May 28, 2020

(30) Foreign Application Priority Data

Nov. 28, 2018 (JP) .............................. JP2018-222228
Nov. 28, 2018 (JP) .............................. JP2018-222260

(51) Int. Cl.
*G02B 27/01* (2006.01)
*B60K 35/00* (2006.01)

(52) U.S. Cl.
CPC .......... *G02B 27/0149* (2013.01); *B60K 35/00* (2013.01); *G02B 27/0101* (2013.01); *B60K 2370/1529* (2019.05); *B60K 2370/166* (2019.05); *B60K 2370/167* (2019.05)

(58) Field of Classification Search
CPC ........... G02B 27/0149; G02B 27/0101; G02B 27/01; B60K 2370/1529; B60K 35/00
See application file for complete search history.

(56) References Cited

U.S. PATENT DOCUMENTS

| 2006/0262409 | A1* | 11/2006 | Yavid | G03B 21/10 359/619 |
|---|---|---|---|---|
| 2018/0095266 | A1* | 4/2018 | Takahashi | G02B 26/0833 |
| 2019/0278084 | A1 | 9/2019 | Gotoh | |
| 2019/0317323 | A1 | 10/2019 | Yamaoka | |

FOREIGN PATENT DOCUMENTS

| JP | 2015-148665 | | 8/2015 |
|---|---|---|---|
| JP | 2017-015806 | A | 1/2017 |
| JP | 2017-226251 | A | 12/2017 |
| JP | 2018-060023 | A | 4/2018 |
| JP | 2018-112628 | A | 7/2018 |
| JP | 2019-159066 | | 9/2019 |

OTHER PUBLICATIONS

Partial European Search Report dated May 4, 2020, issued in corresponding European Patent Application No. 19202267.1, 13 pages.

* cited by examiner

*Primary Examiner* — Ryan D Howard
(74) *Attorney, Agent, or Firm* — Xsensus LLP

(57) ABSTRACT

A display device and a mobile object. The display device is installable in a mobile object, and includes a light source, an image former to receive light emitted from the light source and output image light that forms an image, a screen on which the image light forms the image, a housing that houses the light source and the image former, and a holding member to hold the screen. The holding member is attached to the housing with a normal direction of a surface of the screen intersecting with a vertical direction and with a front-and-rear direction of the mobile object. A width of the housing is narrower than a width of the holding member. The mobile object includes the display device, a front windshield to reflect the image light, and an image-forming optical system to project the image light projected from the screen toward the front windshield.

20 Claims, 17 Drawing Sheets

DISPLAY DEVICE AND MOBILE OBJECT

CROSS-REFERENCE TO RELATED APPLICATIONS

This patent application is based on and claims priority pursuant to 35 U.S.C. § 119(a) to Japanese Patent Application Nos. 2018-222228 and 2018-222260, filed on Nov. 28, 2018, and Nov. 28, 2018, respectively, in the Japan Patent Office, the entire disclosures of which are hereby incorporated by reference herein.

BACKGROUND

Technical Field

Embodiments of the present disclosure relate to a display device and a mobile object.

Background Art

A heads-up display that is installed in an automobile is known in the art. The heads-up display uses a windshield technique, according to which a front windshield is used as a part of a projector surface.

SUMMARY

Embodiments of the present disclosure described herein provide a display device and a mobile object. The display device is installable in a mobile object, and includes a light source, an image former configured to receive light emitted from the light source and output image light that forms an image, a screen on which the image light forms the image, a housing that houses the light source and the image former, and a holding member configured to hold the screen. The holding member is attached to the housing with a normal direction of a surface of the screen intersecting with a vertical direction and with a front-and-rear direction of the mobile object. A width of the housing is narrower than a width of the holding member. The mobile object includes the display device, a front windshield configured to reflect the image light, and an image-forming optical system configured to project the image light projected from the screen toward the front windshield. The screen through which the image light diverges projects the image light.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
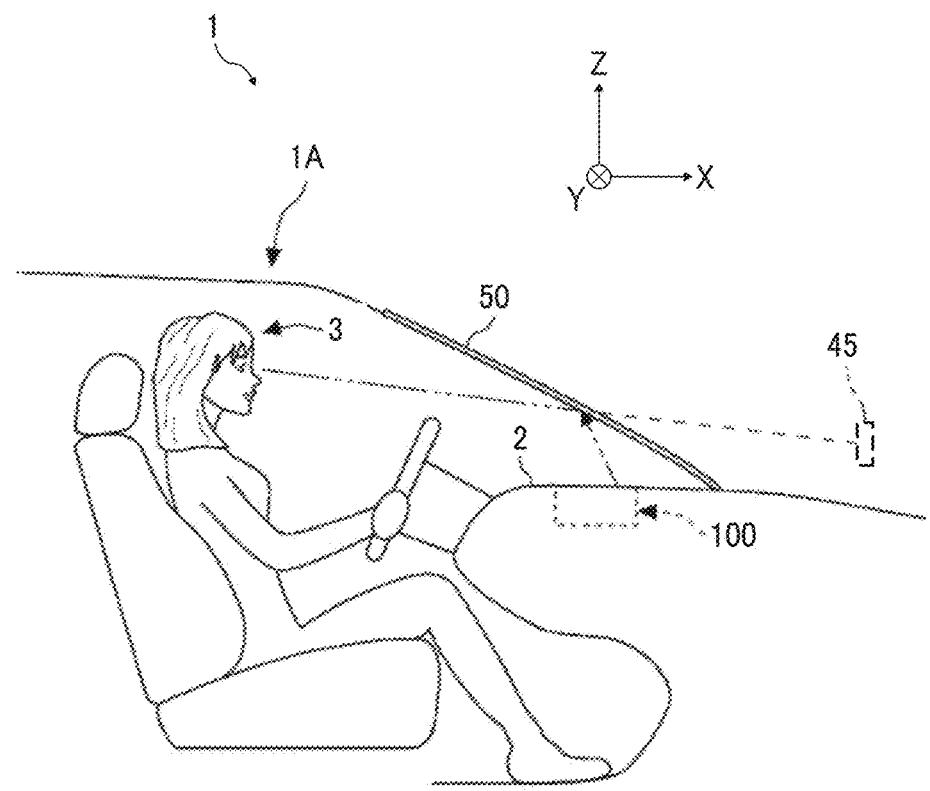
FIG. 1 is a view illustrating a system configuration of a display system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An embodiment will be described below with reference to the drawings. It should be noted that in the description of the drawings, the same components are denoted by the same reference symbols to avoid duplication of description.

FIG. 1 is a view illustrating a system configuration of a display system according to an embodiment.

A display system 1 causes light projected from an on-board device 100 to be reflected on a translucent reflection member, allowing a viewer 3 to see a display image. The display image is an image superimposed as a virtual image 45 in a field of view of the viewer 3. For example, the display system 1 is installed in a mobile object, such as a vehicle, an aircraft, or a ship, or an immobile object, such as an operation simulation system or a home theater system. The present embodiment will be explained with reference to an instance where the display system 1 is installed in an automobile, that is, an example of a mobile object 1A. It should be noted that such a usage of the display system 1 is not exhaustive. Hereinbelow, a travel direction, a right-and-left direction, and an up-and-down direction of the mobile object 1A are respectively defined as coordinate axes X, Y, and Z.

For example, the display system 1 allows the viewer 3 (driver) to see navigation Information necessary for vehicle operation (e.g., vehicle speed, route information, distance to a destination, name of a current location, presence/absence and location of an object (target) in front of the vehicle, traffic sign such as speed limit, and traffic jam information) through a front windshield 50. In this case, the front windshield 50 functions as a translucent reflection member that lets a part of incident light through while reflecting at least part of the rest of light. The front windshield 50 is spaced from a position of a point of view of the viewer 3 at a distance of several ten centimeters to one meter, approximately. It should be noted that a combiner in the form of, for example, a compact transparent plastic disc may be used as a translucent reflection member instead of the front windshield 50.

For example, the on-board device 100 is a head-up display device (HUD device) The on-board device 100, which is disposed at any position in accordance with an interior design of the automobile, may be disposed, for example, below a dashboard 2 of the automobile or embedded in the dashboard 2. The present embodiment will be described with reference to an instance where the on-board device 100 is installed in the dashboard 2.

Figure 2:
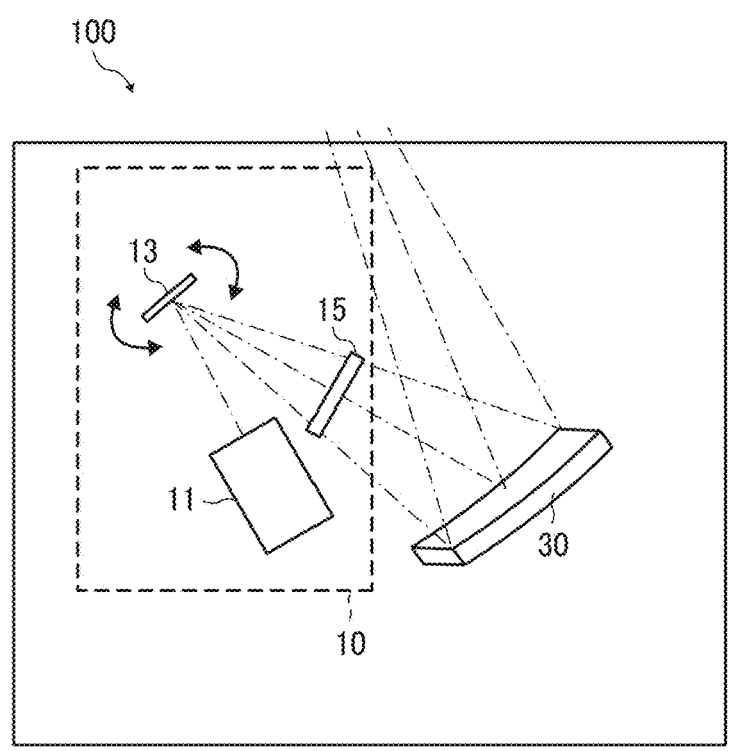
FIG. 2 is a view illustrating a configuration of an on-board device according to an embodiment of the present disclosure.

FIG. 2 is a view illustrating a configuration of the on-board device 100 according to the present embodiment. The on-board device 100 includes a display device 10, a free-form mirror 30, and the front windshield 50.

The display device 10 includes a light source device 11, light deflector 3, and a screen 15. The light source device 11 is a device that applies a laser beam emitted from a light source to an outside of the device. For example, the light source device 11 may apply a laser beam produced by combining lights with three colors such as R, G, and B. The laser beam applied from the light source device 11 is led to a reflection surface of the light deflector 13. The light source device 11 includes a semiconductor light-emitting element, such as a laser diode (LD), as the light source. It should be noted that instead of such a semiconductor light-emitting element, the light source may include any other semiconductor light-emitting element such as a light-emitting diode (LED).

The light deflector 13, which is an example of an image forming unit that receives the light applied from the light source device 11 and outputs image light that forms an image, is a device that changes a travel direction of a laser beam with the use of, for example, a micro electro mechanical system (MEMS). For example, the light deflector 13 includes a scanner with a mirror system that includes a single micro MEMS mirror swingable around two perpendicular axes or two MEMS mirrors each swingable or rotatable around a single axis. The light deflector the screen 15 is scanned by the laser beam outputted from the light deflector 13. It should be noted that the light deflector 13 may include, for example, a polygon mirror instead of the MEMS mirror.

The screen 15, which is an example of a screen to which the image light is outputted from the light deflector 13 to form an image, is a divergent part through which a laser beam diverges at a predetermined divergence angle. For example, the screen 15 may be in the form of an exit pupil expander (EPE), including a translucent optical element through which light diffuses, such as a microlens array (MLA) or a diffuser plate. Alternatively, the screen 15 may include a reflective optical element through which light diffuses, such as a micromirror array. The screen 15 allows a two-dimensional image, i.e., an intermediate image 40, to be formed on the screen 15 as light deflector the screen 15 is scanned by the laser beam outputted from the light deflector 13.

In this regard, examples of a projection technique of the display device 10 include a "panel technique" where the intermediate image 40 is formed with the use of an imaging device such as a liquid crystal panel, digital mirror device panel (DMD panel), or a vacuum fluorescent display (VFD) and a "laser-scanning technique" where a scanner is scanned by the laser beam outputted from the light source device 11 to form the intermediate image 40.

The display device 10 according to the present embodiment employs the latter "laser-scanning technique." The "laser-scanning technique" allows for determining whether or not light is emitted per pixel, thus usually providing a high-contrast image. It should be noted that the display device 10 may employ the "panel technique" as the projection technique.

With the laser beam (luminous flux) outputted from the screen 15, the virtual image 45 is projected on the free-form mirror 30 and the front windshield 50, appearing in the form of an enlargement of the intermediate image 40. The free-form mirror 30 is designed and disposed to offset, for example, at least one of inclination, deformation, or positional displacement of an image resulting from a curved shape of the front windshield 50. The free-form mirror 30 may be disposed for relative rotation about a predetermined rotation axis. This allows the free-form mirror 30 to adjust a reflection direction of the laser beam (luminous flux) outputted from the screen 15 for a change in a displayed position of the virtual image 45.

In this regard, to form the virtual image 45 at a desired position, the free-form mirror 30 is designed to exhibit a certain amount of a light-condensing power with the use of an existing optical design simulation software. The display device 10 sets the light-condensing power of the free-form mirror 30 to a level allowing the virtual image 45 to appear at a position (depth position) distant from the position of the point of view of the viewer 3 by, for example, not less than 1 m and not more than 30 m (preferably, not more than 10 m). It should be noted that the free-form mirror 30 may be a concave mirror or any other element with a light-condensing power. The free-form mirror 30 is an example of an image-forming optical system.

The front windshield 50 is a translucent reflection member with a function of letting a part of a laser beam (luminous flux) through while reflecting at least part of the rest of the laser beam (partial reflection function). The front windshield 50 functions as a semi-translucent mirror that allows the viewer 3 to see a view and the virtual image 45 in front of the viewer 3. For example, the virtual image 45 is image information that allows the viewer 3 to see vehicle information (e.g., speed and travel distance), navigation information (e.g., route guidance and traffic information), and warning information (e.g., collision warning). It should be noted that the translucent reflection member may be, for example, another front windshield independent of the front windshield 50. The front windshield 50 is an example of a reflection member.

The virtual image 45 may be superimposed on a view in front of the front windshield 50 as appearing. Incidentally, the front windshield 50 is not flattened but curved. Thus, a curvature of each of the free-form mirror 30 and the front windshield 50 determines the position where the virtual image 45 is formed. It should be noted that a separate semi-translucent mirror (combiner), i.e., the translucent reflection member, with a partial reflection function may be used as the front windshield 50.

The above configuration allows the laser beam (luminous flux) outputted from the screen 15 to be projected toward the free-form mirror 30 and reflected on the front windshield 50. The light reflected on the front windshield 50 allows the viewer 3 to see the virtual image 45, which is the enlargement of the intermediate image 40 formed on the screen 15.
(Configuration of Attachment Portion)

Figure 3:
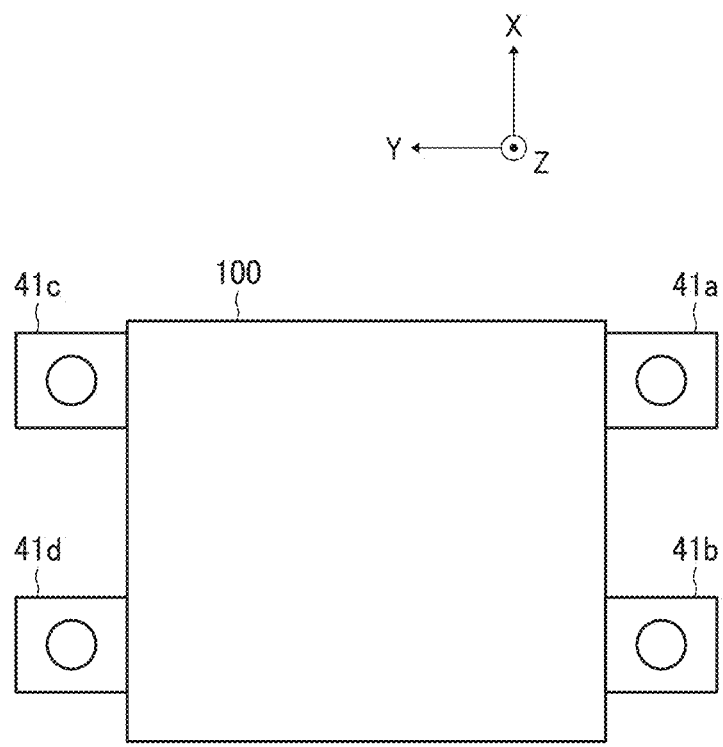
FIG. 3 is a top view of the on-board device according to an embodiment of the present disclosure.

FIG. 3 is a top view of the on-board device 100. As illustrated in FIG. 3, the on-board device 100 includes attachment portions 41a to 41d for attaching the on-board device 100 to the mobile object 1A, which are arranged in a pair on each of a right-side surface and a left-side surface of the on-board device 100. The attachment portions 41a to 41d are each provided with a screw hole and the on-board device 100 is attached to the mobile object 1A via the screw hole.

Figure 4:
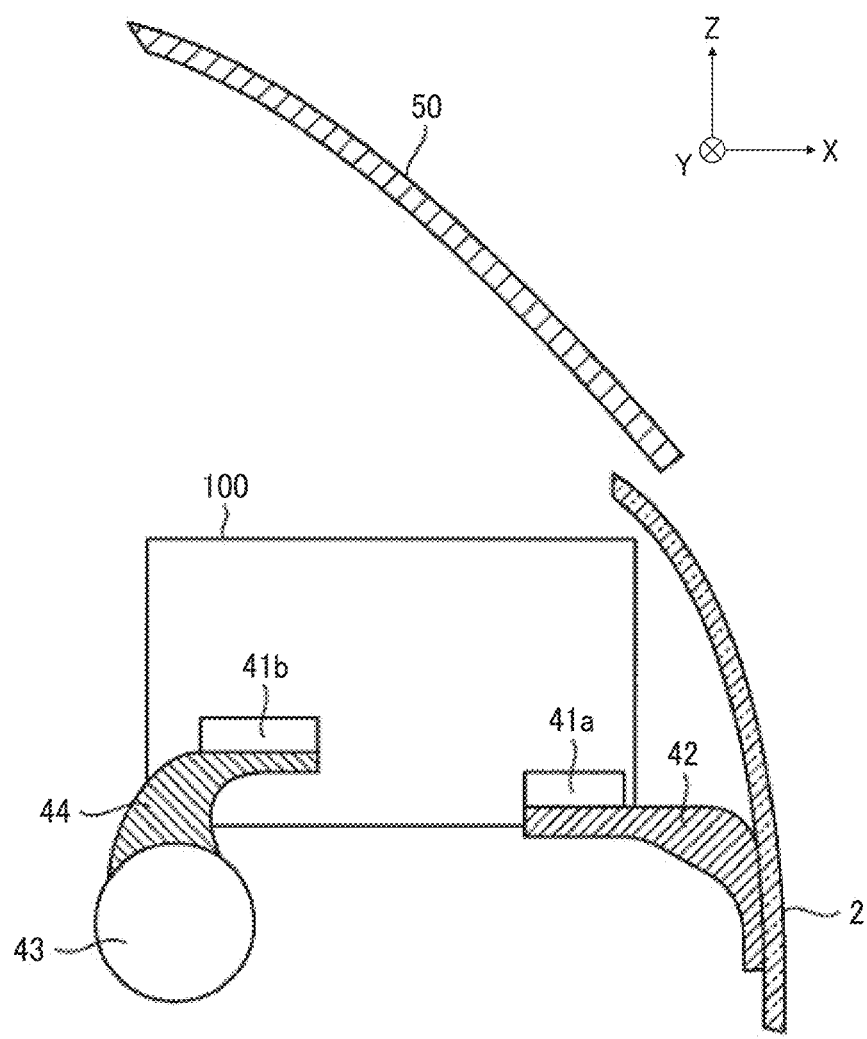
FIG. 4 is a side view of the on-board device according to an embodiment of the present disclosure.

FIG. 4 is a side view of the on-board device 100 attached to the mobile object 1A as viewed from the right side. The mobile object 1A includes an attachment bracket 42 welded or fastened to the dashboard (instrument panel) 2 and an attachment bracket 44 welded or fastened to a cross car beam 43. The attachment bracket 42 and the attachment bracket 44 are an example of an installation portion. The on-board device 100 is attached to the mobile object 1A by, for example, screwing the attachment portion 41a and the attachment portion 41c to the bracket 42 and screwing the attachment portion 41b and the attachment portion 41d to the attachment bracket 44.

Figure 5:
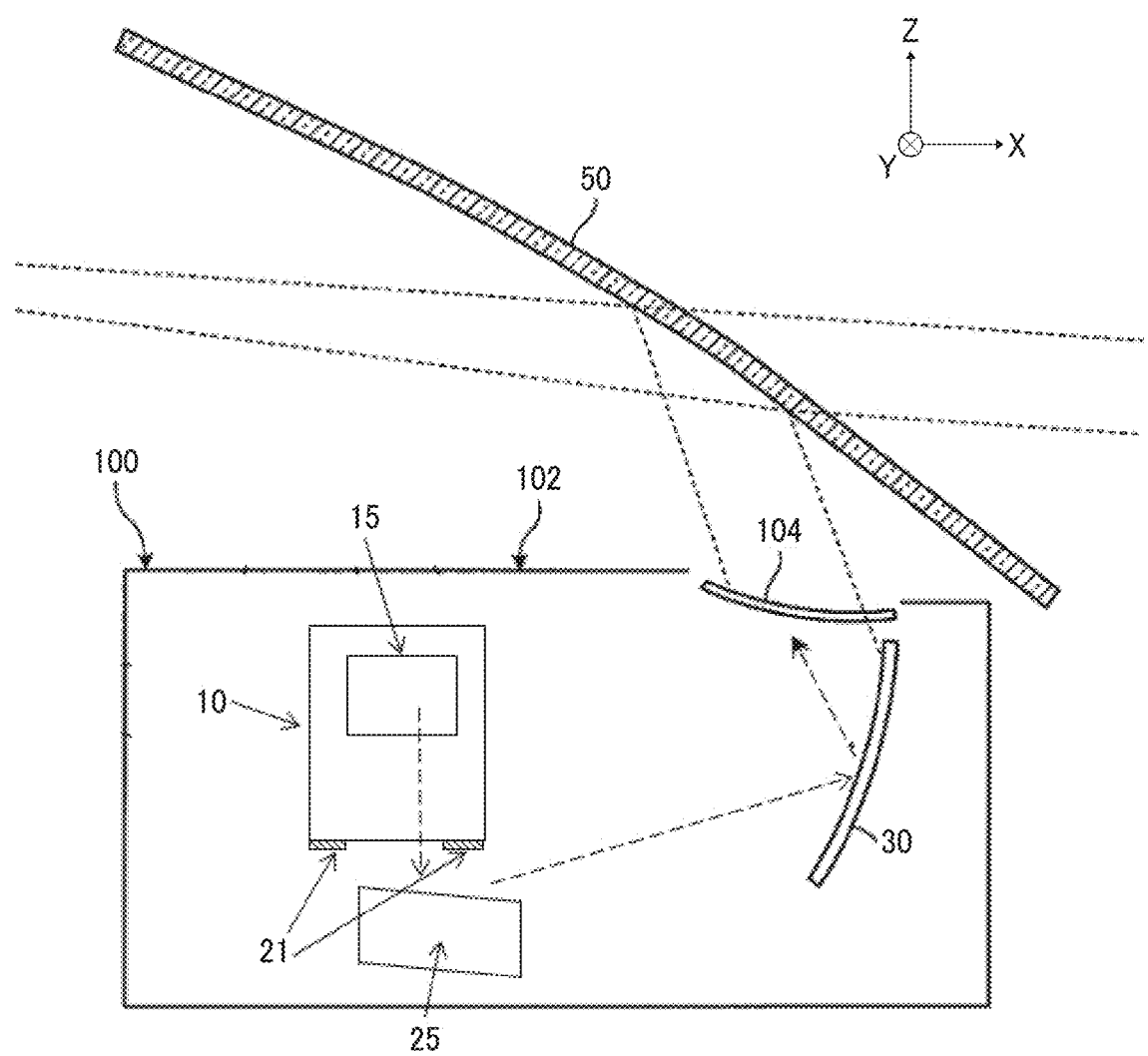
FIG. 5 is a side cross-sectional view of the on-board device according to an embodiment of the present disclosure.
Figure 6:
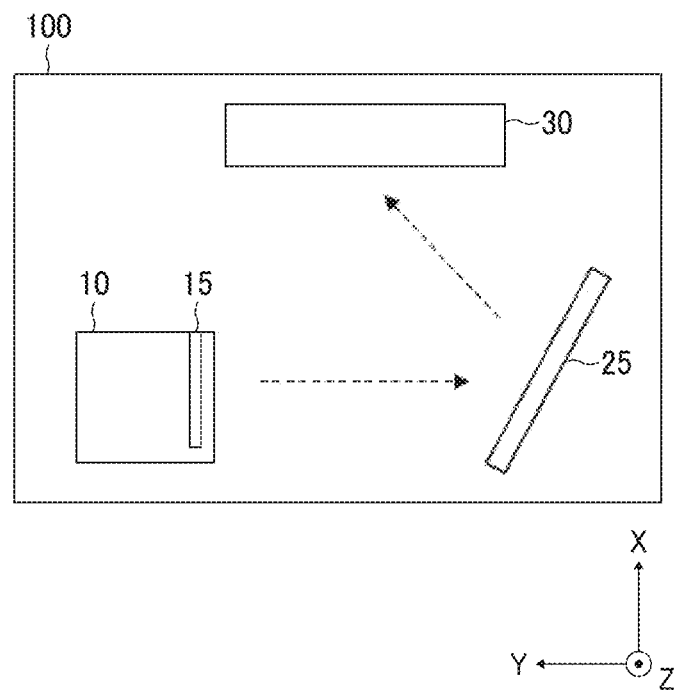
FIG. 6 is atop cross-sectional view of the on-board device according to an embodiment of the present disclosure.

FIG. 5 is a side cross-sectional view of the on-board device 100 as viewed along a right direction (from the right side along the Y-direction). FIG. 6 is a top cross-sectional view of the on-board device 100 as viewed along an upward direction (Z-direction). FIG. 5 and FIG. 6 each illustrate a specific arrangement inside the on-board device 100.

The on-board device 100 includes an enclosure 102 that houses, in addition to the display device 10 and the free-form mirror 30 described with reference to FIG. 2, a return mirror 25 that reflects the laser beam projected from the display device 10 toward the free-form mirror 30. The enclosure 102 is provided with an output window 12 that lets the light reflected on the free-form mirror 30 through to be projected on the front windshield 50. The display device 10 and the screen 15 are disposed to allow the laser beam to be projected rightward (the right side along the Y-direction).

Figure 7:
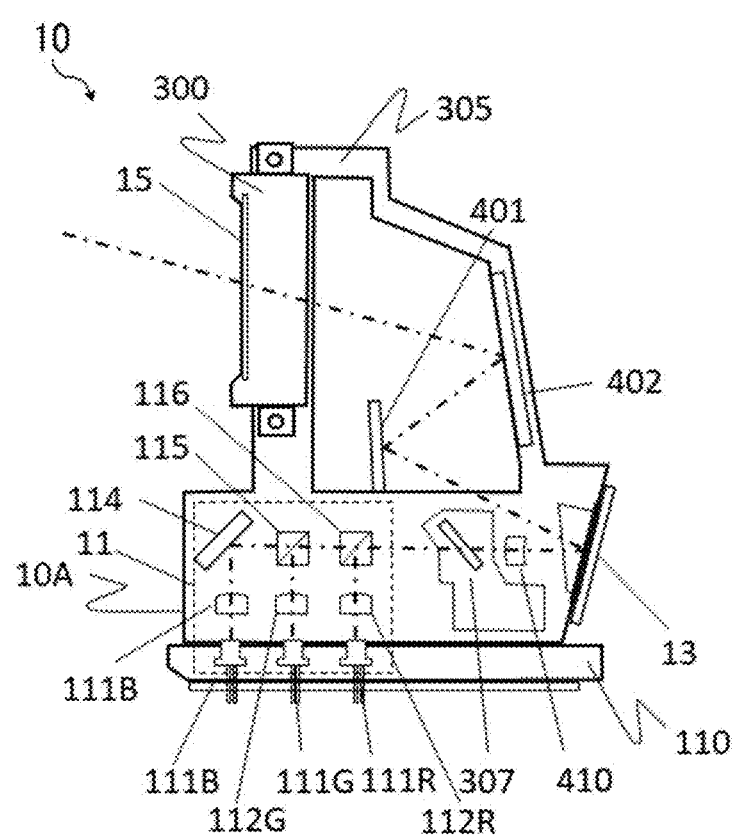
FIG. 7 is a view illustrating a configuration of a display device according to an embodiment of the present disclosure.

FIG. 7 is a view illustrating a configuration of the display device 10. In addition to the light source device 11, the light deflector 13, and the screen 15 described with reference to FIG. 2, the display device 10 further includes a filter 307 that optically modulates the laser beam outputted from the light source device 11, a condenser lens 410 that condenses light optically modulated by the filter 307 toward the light deflector 13, a mirror 401 that reflects the light polarized by the light deflector 13, and a second mirror 402 that reflects the light reflected on the mirror 401 toward the screen 15.

The light source device 11 includes light source elements 111R, 111G, and 111B (hereinafter referred to as light source elements 111 if not needing to be differentiated), coupling (collimate) lenses 112R, 112G, and 112B, apertures 113R, 113G, and 113B, combining elements 114, 115, and 116, and lens 117.

For example, the light source elements 111R, 111G, and 111B of three colors (R, G, and B) are each a laser diode (LD) with a single luminous point or a plurality of luminous points. The light source elements 111R, 111G, and 111B emit respective laser beams (luminous fluxes) with mutually different wavelengths $\lambda R$, $\lambda G$, and $\lambda B$ (e.g., $\lambda R=640$ nm, $\lambda G=530$ nm, and $\lambda B=445$ nm).

The emitted laser beams (luminous fluxes) are respectively coupled into substantially parallel luminous fluxes by the coupling lenses 112R, 112G, and 112B. The coupled laser beams (luminous fluxes) are combined by the three combining elements 114, 115, and 116. The combining elements 114, 115, and 116, each of which is a plate-shaped or prism-shaped dichroic mirror, reflect or let the laser beams (luminous fluxes) through in accordance with a wavelength, thereby combining the laser beams into a single luminous flux. The combined luminous flux passes through the filter 307 and the condenser lens 410, being led to the light deflector 13.

The display device 10 includes an assembly of a housing 10A, a mirror unit (mirror holding member) 305, and a screen unit 300. The housing 10A holds and houses the light source elements 111R, 111G, and 111B, the coupling lenses 112R, 112G, and 112B, the combining elements 114, 115, and 116, the filter 307, the condenser lens 410, and the light deflector 13. The mirror unit 305 holds the mirror 401 and the second mirror 402. The screen unit 300 is an example of a holding member holding the screen 15.

A light source unit 110, which is removable from the housing 10A, holds the light source elements 111R, 111G, and 111B.

Figure 8:
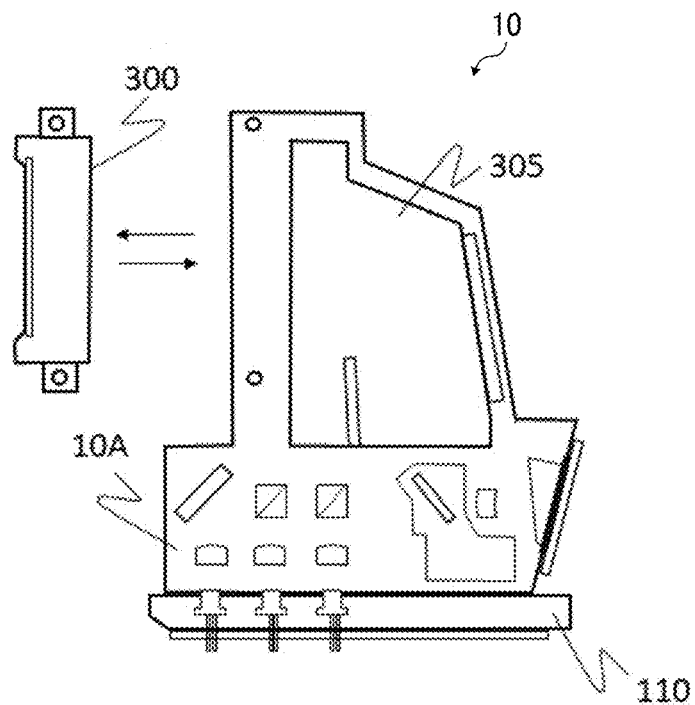
FIG. 8 is a view illustrating attachment/removal of a screen unit to/from the display device according to an embodiment of the present disclosure.

FIG. 8 is a view illustrating attachment/removal of the screen unit 300 to/from the display device 10. The screen unit 300 is removably attachable to the housing 10A without the necessity of removing the light source unit 110 and the mirror unit 305 from the housing 10A. Moreover, the screen unit 300 is removably attachable to the housing 10A without the necessity of removing the light source device 11, the filter 307, the condenser lens 410, and the light deflector 13 from the housing 10A.

Furthermore, the housing 10A is formed by aluminum die-casting and the mirror unit 305 is formed from a resin, so that a thermal conductivity of the housing 10A is higher than a thermal conductivity of the mirror unit 305.

While the image light that is diverged from the screen 15 reaches the front windshield 50 along a light path illustrated in FIGS. 1 and 2, sunlight applied to the front windshield 50 sometimes reaches at least one of the screen 15 or the screen unit 300 as inversely travelling along the light path in actual use. In this case, it is possible that deformation and discoloration of the screen 15 is caused by the heat of the sunlight, decreasing the image quality.

Accordingly, the screen unit 300 is attached to the housing 10A in the present embodiment. This facilitates release of the heat of the screen 15 and the screen unit 300 as compared with a case where the screen unit 300 is attached to the mirror unit 305 disposed upstream along the light path, allowing for reducing a decrease in the image quality.

Furthermore, since the screen unit 300 is removably attachable to the housing 10A without the necessity of removing the mirror 401 and the second mirror 402, which are held by the mirror unit 305, the light deflector 13, etc., the screen unit 300 is allowed to be solely replaced or maintained without difficulty. Thus, if the screen 15 is deformed or discolored, it is possible to replace or maintain the screen 15 to reduce a decrease in the image quality.

Meanwhile, it is necessary to finely adjust the size, location, and the angle of the screen 15 suitably to an image-forming optical system (free-form mirror 30) in accordance with a different curvature of the front windshield 50 depending on the type (vehicle type) of the mobile object 1A. However, the screen unit 300 is removably attachable to, for example, the housing 10A, allowing, for example, the housing 10A to be used in common for an improved productivity.

Figure 9:
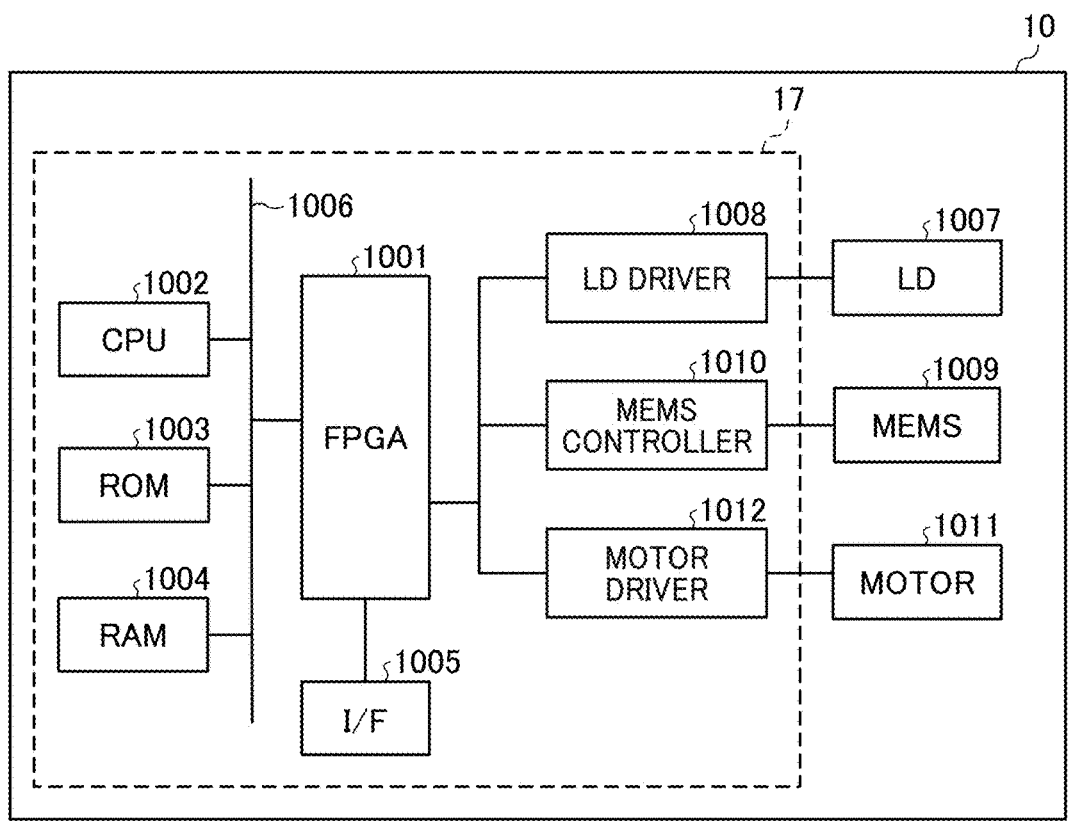
FIG. 9 is a view illustrating a hardware configuration of the display device according to an embodiment of the present disclosure.

FIG. 9 is a view illustrating a hardware configuration of the display device according to the present embodiment. It should be noted that the hardware configuration illustrated in FIG. 2 may accept addition or deletion of components as needed.

The display device 10 includes a control device 17 for controlling an operation of the display device 10. For example, the control device 17 is a controller for a substrate or an integrated circuit (IC) chip provided in the display device 10. The control device 17 includes a field-programmable gate array (FPGA) 1001, a central processing unit (CPU) 1002, a read only memory (ROM) 1003, a random access memory (RAM) 1004, an interface (I/F) 1005, a bus line 1006, an LD driver 1008, a MEMS controller 1010, and a motor driver 1012.

The FPGA 1001 is an integrated circuit, settings of which are changeable by a designer of the display device 10. The LD driver 1008, the MEMS controller 1010, and the motor driver 1012 each generate a driving signal in accordance with a control signal from the FPGA 1001. The CPU 1002 is an integrated circuit that performs a process for controlling the entirety of the display device 10. The ROM 1003 is a storage that stores a program for controlling the CPU 1002.

The RAM 1004 is a storage that functions as a work area for the CPU 1002. The I/F 1005 is an interface for communication with an external device. The I/F 1005 is connected to, for example, a controller area network (CAN).

For example, the LD 1007 is a semiconductor light-emitting element that constitutes the light source device 11. The LD driver 1008 is a circuit that generates a driving signal for driving the LD 1007. The MEMS 1009 is a device that constitutes the light deflector 13 and causes displacement of a scanning mirror. The MEMS controller 1010 is a circuit that generates a driving signal for driving the MEMS 1009. The motor 1011 is an electric motor that causes a rotation of a rotary shaft of the free-form mirror 30. The motor driver 1012 is a circuit that generates a driving signal for driving the motor 1011.

Figure 10:
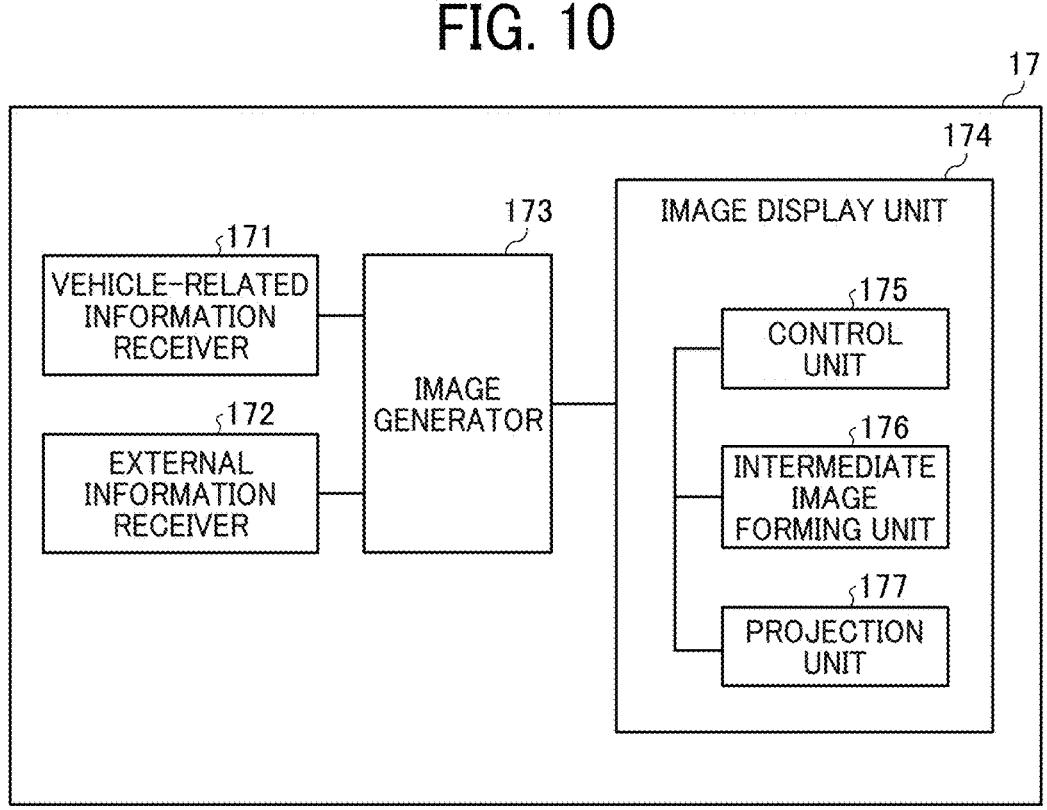
FIG. 10 is a view illustrating a functional configuration of the display device according to an embodiment of the present disclosure.

FIG. 10 is a view illustrating a functional configuration of the display device according to the present embodiment. Functions implemented by the display device 10 include a vehicle information receiving unit 171, an external information receiving unit 172, an image generating unit 173, and an image displaying unit 174.

The vehicle information receiving unit 171 is a function of receiving information regarding the automobile (information such as speed and travel distance) from, for example, the CAN. The vehicle information receiving unit 171 is implemented by, for example, processes by the I/F 1005 and the CPU 1002 illustrated in FIG. 2 and a program stored in the ROM 1003.

The external information receiving unit 172 is a function of receiving external information regarding the automobile from an external network (e.g., location information from a global positioning system (GPS) and route information or traffic information from a navigation system). The external information receiving unit 172 is implemented by, for example, processes by the I/F 1005 and the CPU 1002 illustrated in FIG. 2 and a program stored in the ROM 1003.

The image generating unit 173 is a function of generating image information for displaying the intermediate image 40 and the virtual image 45 on the basis of information inputted from the vehicle information receiving unit 171 and the external information receiving unit 172. The image generating unit 173 is implemented by, for example, a process by the CPU 1002 illustrated in FIG. 2 and a program stored in the ROM 1003.

The image displaying unit 174 is a function of forming the intermediate image 40 on the screen 15 on the basis of the image information generated by the image generating unit 173 and projecting a laser beam (luminous flux) that provides the intermediate image 40 toward the front windshield 50 to display the virtual image 45. The image displaying unit 174 is implemented by, for example, processes by the CPU 1002, the FPGA 1001, the LD driver 1008, the MEMS controller 1010, and the motor driver 1012 illustrated in FIG. 2 and a program stored in the ROM 1003.

The image displaying unit 174 includes a controlling unit 175, an intermediate image forming unit 176, and a projecting unit 177. The controlling unit 175 generates a control signal for controlling an operation of each of the light source device 11 and the light deflector 13 to form the intermediate image 40. Additionally, the controlling unit 175 generates a control signal for controlling an operation of the free-form mirror 30 to display the virtual image 45 at a predetermined position.

The intermediate image forming unit 176 forms the intermediate image 40 on the screen on the basis of the control signal generated by the controlling unit 175. To form the virtual image 45 to be seen by the viewer 3, the projecting unit 177 projects the laser beam that provides the intermediate image 40 to the translucent reflection member (e.g., the front windshield 50).

Figure 11:
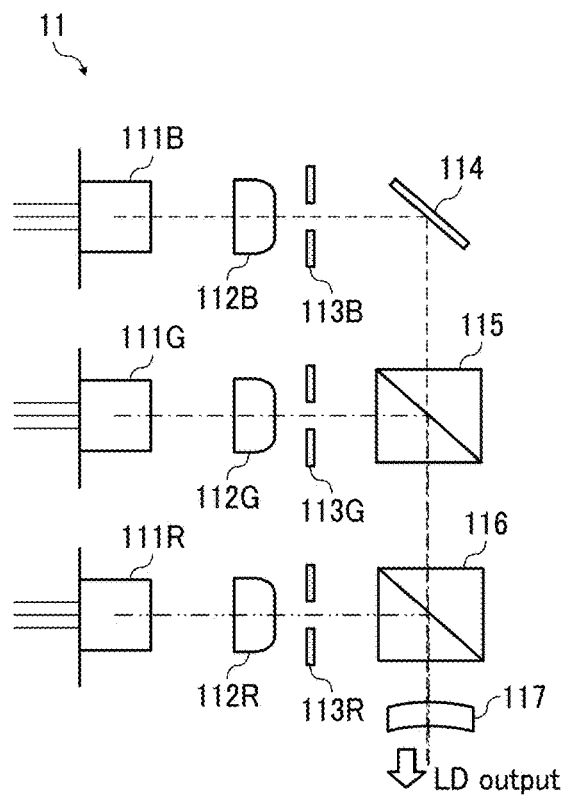
FIG. 11 is a view illustrating a specific configuration of a light source device according to an embodiment of the present disclosure.

FIG. 11 is a view illustrating a specific configuration of the light source device 11 according to the present embodiment. In addition to the components described with reference to FIG. 7, the light source device 11 includes the apertures 113R, 113G, and 113B, which are respectively disposed between the coupling lenses 112R, 112G, and 112B and the combining elements 114, 115, and 116 to shape the laser beams (luminous fluxes) coupled by the coupling lenses 112R, 112G, and 112B. The apertures 113R, 113G, and 113B each have a shape (e.g., circle, oval, rectangle, and square) in accordance with predetermined conditions such as a divergence angle of the laser beam (luminous flux).

Figure 12:
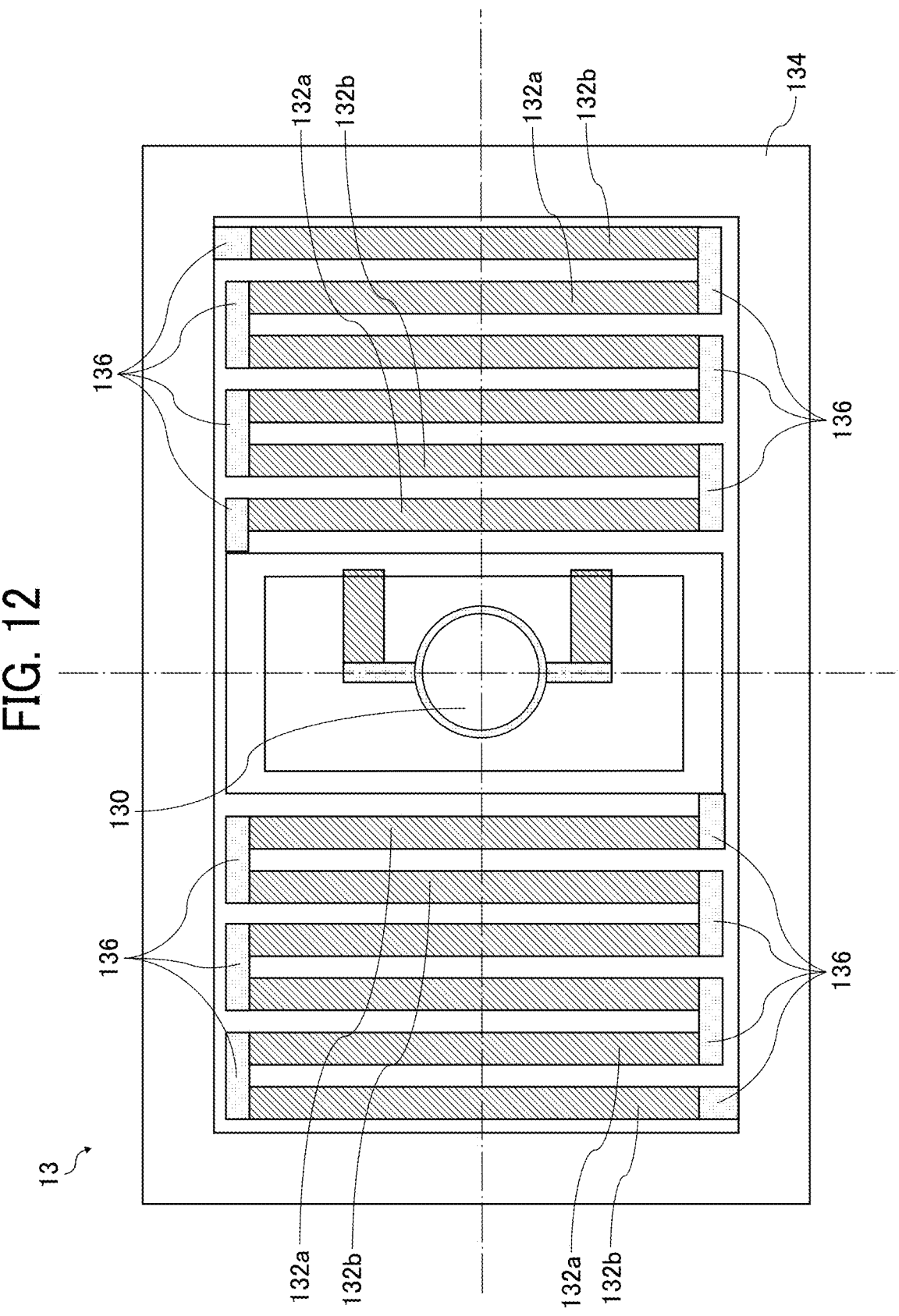
FIG. 12 is a view illustrating a specific configuration of a light deflector according to an embodiment of the present disclosure.

FIG. 12 is a view illustrating a specific configuration of the light deflector according to the present embodiment. The light deflector 13, which is a MEMS manufactured by a semiconductor process, includes a mirror 130, serpentine beams 132, a frame member 134, and piezoelectric members 136. The light deflector 13 is an example of a scanning unit.

The mirror 130 has a reflection surface that reflects the laser beam outputted from the light source device 11 toward the screen 15. The serpentine beams 132 of the light deflector 13 are arranged in a pair opposed to each other across the mirror 130. The serpentine beams 132 each have a plurality of folded portions. The folded portions include first beams 132a and second beams 132b that are alternately disposed. The serpentine beams 132 are supported by the frame member 134. The piezoelectric members 136 are disposed to couple adjacent ones of the first beams 132a and the second beams 132b. The piezoelectric members 136 apply a different voltage to each of the first beams 132a and the second beams 132b, causing the beams 132a and 132b to independently warp.

The adjacent ones of the beams 132a and 132b thus become bent in different directions. Accumulation of the bending causes the mirror 130 to vertically rotate around an axis along the right-and-left direction. Such a configuration allows the light deflector 13 to perform a vertical optical scanning at a low voltage. A horizontal optical scanning around an axis along the up-and-down direction is performed by resonance with the use of a torsion bar coupled to the mirror 130.

Figure 13:
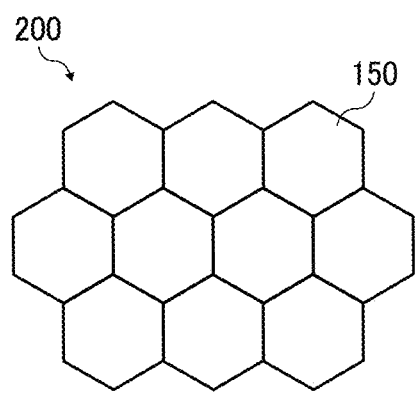
FIG. 13 is a view illustrating a specific configuration of a screen according to an embodiment of the present disclosure.

FIG. 13 is a view illustrating a specific configuration of the screen according to the present embodiment. The screen 15 allows the laser beam outputted from the LD 1007, which constitutes the light source device 11, to form an image. The screen 15 also serves as the divergent part that enables divergence at the predetermined angle. The screen 15 illustrated in FIG. 13 includes a plurality of curved portions that are curved such that the light diverges through the screen 15. For example, the screen 15 has a microlens-array structure where a plurality of hexagonal microlenses 150 (convex portions as an embodiment of the curved portions) that are tightly arranged. A lens diameter (a distance between opposite two sides) of the microlenses 150 is approximately 200 μm. Since the microlenses 150 of the screen 15 each have a hexagonal shape, it is possible to densely arrange the plurality of microlenses 150. It should be noted that a microlens array 200 and the microlenses 150 according to the present embodiment will be described later in detail.

Figure 14A:
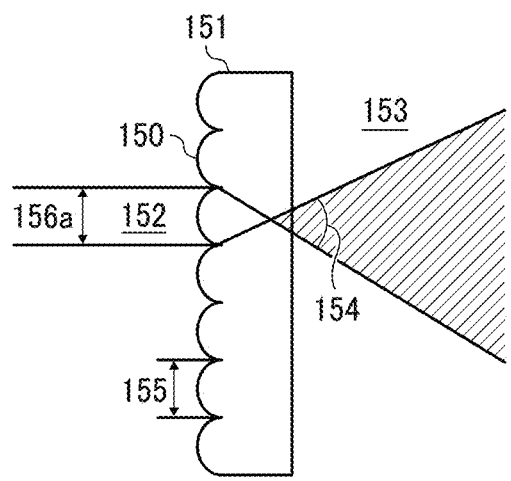
FIGS. 14A and 14B are views illustrating a difference in effect resulting from a difference in magnitude correlation between a flux diameter of incident light and a lens diameter in a microlens array, according to an embodiment of the present disclosure.
Figure 14B:
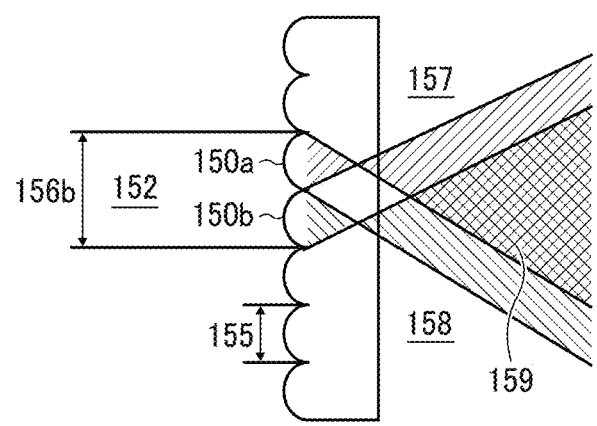

FIGS. 14A and 14B are views illustrating a difference in effect resulting from a difference in magnitude correlation between a flux diameter of incident light and a lens diameter in the microlens array. In FIG. 14A, the screen 15 includes an optical plate 151 provided by aligning the microlenses 150. As the optical plate 151 is scanned by incident light 152, the incident light 152 turns to be diverging light 153 as diverging thorough the microlenses 150. The screen 15 allows the incident light 152 to diverge at a desired divergence angle 154 on the basis of the structure of the microlenses 150. A lens diameter 155 of the microlenses 150 is designed to be larger than a diameter 156a of the incident light 152. The screen 15 thus allows for reducing occurrence of interference noise without causing interference among the lenses.

FIG. 14B illustrates a light path of the diverging light in a case where the incident light 152 has a diameter 156b twice as large as the lens diameter 155 of the microlenses 150. The incident light 152 enters two microlens 150a and microlens 150b, causing diverging light 158 and diverging light 157. Simultaneously, optical interference possibly occurs in a region 159 where the two diverging light are present. When entering the eye of the viewer, such interference light is seen as interference noise.

In view of the above, to reduce the interference noise, the lens diameter 155 of the microlenses 150 is designed to be larger than the diameter 156 of the incident light. It should be noted that although FIGS. 14A and 14B illustrate the present embodiment with the convex lenses, an embodiment with concave lenses will achieve the similar effect.

Figure 15:
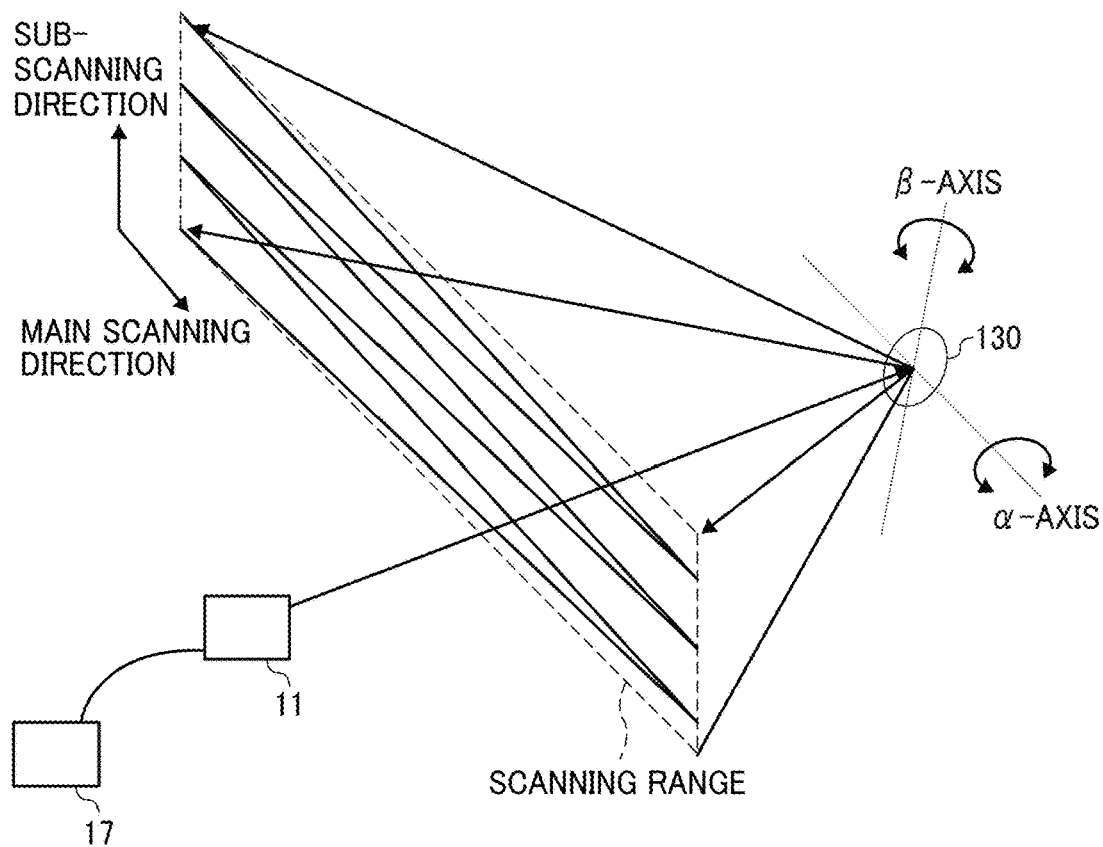
FIG. 15 is a view illustrating the correspondence relationship between a mirror of the light deflector and a scanning range, according to an embodiment of the present disclosure.

FIG. 15 is a view illustrating the correspondence relationship between the mirror of the light deflector and a scanning range. The light source elements of the light source device 11 are each controlled by the FPGA 1001 in terms of emission intensity, lighting time, and optical waveform. The light source elements of the light source device 11 emit respective laser beams as being driven by the LD driver 1008. The respective laser beams emitted from the light source elements and combined in the light path are two-dimensionally polarized around an α-axis and a β-axis by the mirror 130 of the light deflector 13, being applied as scanning light to the screen 15 via the mirror 130 as illustrated in FIG. 15. In other words, the light deflector 13 performs main scanning and sub scanning, i.e., two-dimensional scanning, on the screen 15.

The scanning range means an entire range scannable by the light deflector 13. The scanning light oscillationally scans (reciprocatingly scans) the scanning range in the screen 15 in a main-scanning direction at a high frequency such as approximately 20000 Hz to 40000 Hz, while one-directionally scanning the scanning range in a sub-scanning direction at a low frequency such as approximately several tens Hz. In other words, the light deflector 13 performs raster scanning on the screen 15. In this case, light emission is controlled for each of the light source elements in accordance with the scanning position (a position of the scanning light), thereby allowing the display device 10 to display a drawing or a virtual image on a pixel basis.

A time period required for drawing one picture, that is, a scanning time per frame (one cycle of two-dimensional scanning) is several tens msec, since a sub-scanning cycle is several tens Hz as described above. For example, a main-scanning cycle of 20000 Hz and a sub-scanning cycle of 50 Hz, the scanning time per frame 1 is 20 msec.

Figure 16:
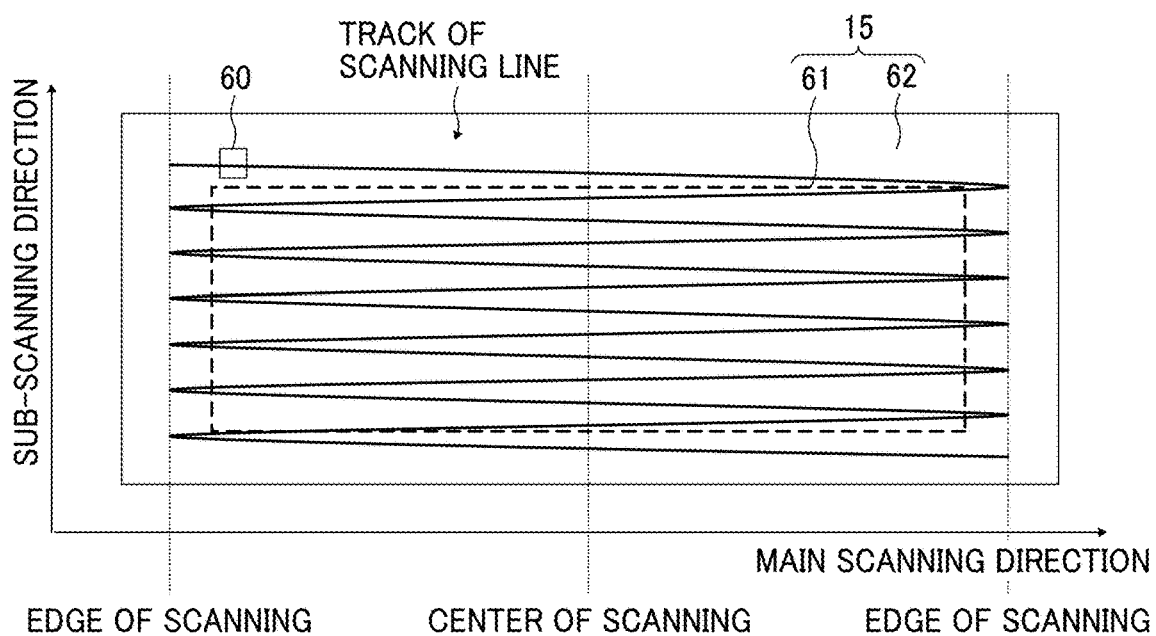
FIG. 16 is a view illustrating the track of a scanning line during two-dimensional scanning.

FIG. 16 is a view illustrating the track of a scanning line during the two-dimensional scanning. As illustrated in FIG. 16, the screen 15 includes an image area 61 (effective scanning region) where the intermediate image 40 is to be drawn (modulated light is to be applied in accordance with image data) and a frame area 62 surrounding the image area 61.

The scanning range is a range defined by a combination of the image area 61 and a part of the frame area 62 (a portion near an outer periphery of the image area 61) in the screen 15. In FIG. 16, a track of scanning line in the scanning range is represented by a zigzag line. In FIG. 16, the number of the scanning lines is less than an actual number for the purpose of convenience.

The screen 15 includes a translucent optical element through which light diffuses, such as the microlens array 200, as described above. The image area 61 is not necessarily rectangular or flat and may be polygonal or curved. Alternatively, the screen 15 may be a reflective optical element through which light diffuses such as a micromirror array in accordance with a device layout. Description of the present embodiment below is based on the assumption that the screen 15 includes the microlens array 200.

The screen 15 includes a synchronization detecting system 60, which includes a light-receiving element, disposed in the scanning range at an area peripheral to the image area 61 (at a part of the frame area 62). In FIG. 16, the synchronization detecting system 60 is disposed in the image area 61 at a corner of −X and +Y. The synchronization detecting system 60 detects an operation of the light deflector 13 and outputs a synchronization signal for determining a scanning-start time and a scanning-end time to the FPGA 1001.

Figure 17:
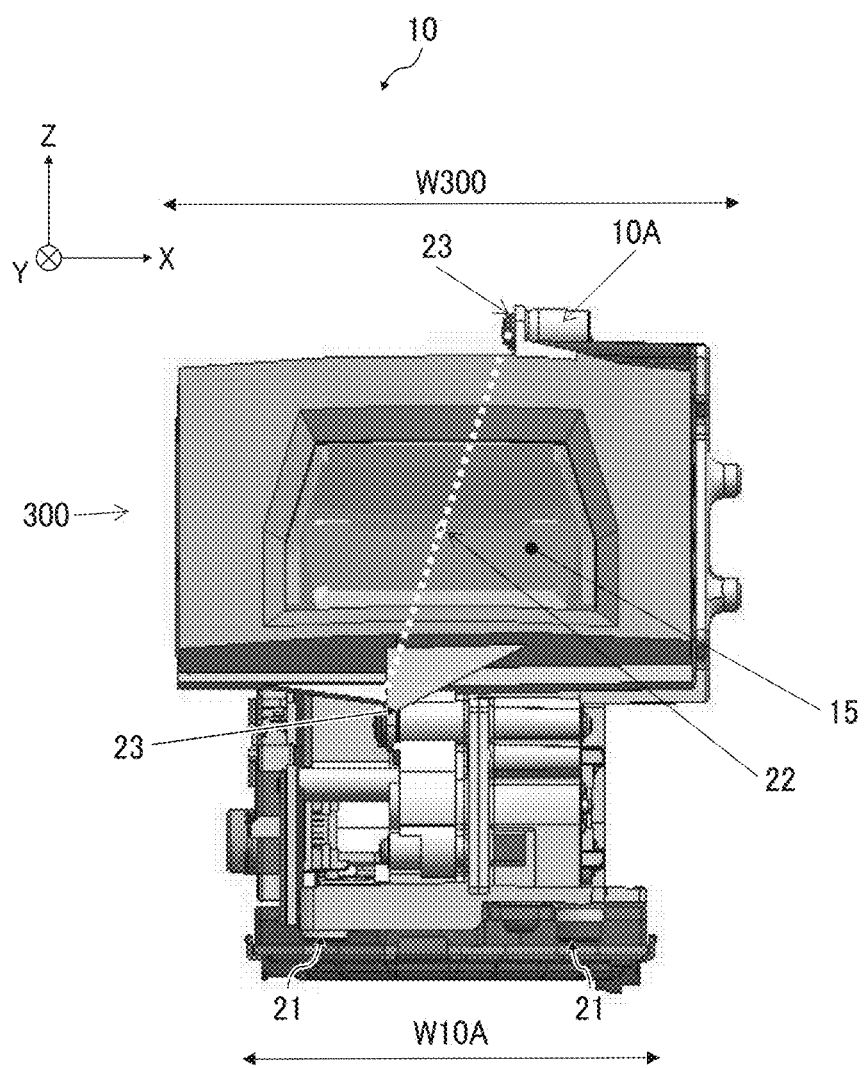
FIG. 17 is a front view of the display device according to an embodiment of the present disclosure.

FIG. 17 is a front view of the display device 10 according to the present embodiment as viewed from the right side along the Y-direction.

The display device 10 is housed in the on-board device 100 as illustrated in FIGS. 5 and 6 and the on-board device 100 is housed in the dashboard 2 as illustrated in FIG. 1. However, since a large amount of a housing space in the dashboard 2 is occupied by built-in components such as a crossbeam, which is a part of a structure frame, a ventilation duct, and an instrument panel including a speed meter and an idiot light, there is only a limited space left for the display device 10 to occupy without interfering these built-in components.

Meanwhile, to superimpose a display image to be seen by the viewer 3 on a nearby vehicle and a pedestrian for augmented reality (AR) display, a display area of the display image needs to be enlarged, requiring an increase in a size of the screen 15, in particular, an increase in an angle of view and a screen size in the main-scanning direction corresponding to the right-and-left direction of the mobile object 1A.

In view of the above, the present embodiment has an object to achieve both an improvement in image quality and a reduction in an occupied space.

Furthermore, since the screen 15 is itself formed from a resin in the form of a thin plate, a deformation of a screen surface is likely to be caused by, for example, vibrations due to road irregularities or an inertial force resulting from disturbance such as acceleration and deceleration of the mobile object 1A, thereby deteriorating the image quality.

The present embodiment has an object to reduce a deterioration in image quality resulting from vibrations of the mobile object 1A.

The display device 10 illustrated in FIG. 17 has a configuration where a width W10A of the housing 10A is smaller than a width W300 of the screen unit 300 along the X-direction. The display device 10 includes a plurality of (four) display device attachment portions 21. The display device 10 is attached to the on-board device 100 at the plurality of display device attachment portions 21. Since an installation surface of the on-board device 100 is not necessarily flush, respective positions (levels) of the plurality of (four) display device attachment portions 21 along the Z-direction may be mutually different. The number of the plurality of display device attachment portions 21 may be three.

The screen unit 300 includes a plurality of (two) unit attachment portions 23. The screen unit 300 is attached to the housing 10A at the plurality of unit attachment portions 23. The number of the unit attachment portions 23 may be three or four.

In an XY plane, a center of the plurality of unit attachment portions 23 substantially matches a screen unit centroid 22. In the present embodiment, since the number of the unit attachment portions 23 is two, the center of the plurality of unit attachment portions 23 corresponds to a midpoint between the two unit attachment portions 23.

An attachment surface of each of the display device attachment portions 21 relative to the on-board device 100 is parallel with the XY plane and a second attachment surface of each of the unit attachment portions 23 relative to the display device 10 is parallel with a YZ plane. It means that the second attachment surface of each of the unit attachment portions 23 relative to the display device 10 is inclined with respect to the attachment surface of each of the display device attachment portions 21 relative to the on-board device 100.

As viewed along the Z-direction, the display device attachment portions 21 are located at a lower side of the housing 10A and the unit attachment portions 23 are located at an upper side of the housing 10A opposite to the display device attachment portions 21. Furthermore, as viewed along the Z-direction, one of the unit attachment portions 23 is located at an upper end of the screen unit 300 and the other unit attachment portion 23 is located at a lower end of the screen unit 300, so that the screen unit 300 is attached to the housing 10A at Z-directional opposite ends.

The X-direction is the main-scanning direction for the light deflector 13 to scan the image light on the screen 15 and the Z-direction is the sub-scanning direction perpendicular to the main-scanning direction.

Accordingly, as viewed along the sub-scanning direction, the unit attachment portions 23 are disposed with respect to the housing 10A opposite to the display device attachment portions 21. Furthermore, the screen unit 300 is attached to the housing 10A at opposite ends along the sub-scanning direction.

As viewed along the main-scanning direction, the width W10A of the housing 10, is smaller than the width W300 of the screen unit 300.

As described above, the display device 10 according to the present embodiment has the configuration where the width W10A of the housing 10A is smaller the width W300 of the screen unit 300 as viewed along the X-direction, i.e., the main-scanning direction. This configuration allows for ensuring the size of the screen 15 along the main-scanning direction to ensure the image quality while reducing the size of the housing 10A along the main-scanning direction to reduce the occupied space in the display device 10.

Furthermore, the screen unit 300 is attached to the housing 10A at the opposite ends along the sub-scanning direction, allowing for making the screen unit 300 less shakable with respect to the display device attachment portions 21 to reduce deterioration of the image quality resulting from vibrations of the mobile object 1A. Furthermore, in the XY plane, the center of the plurality of unit attachment portions 23 substantially matches the screen unit centroid 22. This allows the screen unit 300 to be supported with no moment being applied to the housing 10A to reduce vibrations.

Moreover, the second attachment surface of each of the unit attachment portions 23 relative to the display device 10 is inclined with respect to the attachment surface of each of the display device attachment portions 21 relative to the on-board device 100. This allows for preventing vibrations transferred from the mobile object 1A to the display device 10 via the on-board device 100 from being transferred to the screen unit 300 and the screen 15 via the housing 10A.

Specifically, although a vibration perpendicular to the attachment surface is likely to be transferred to the attachment surface, an inclination of a direction of the vibration perpendicular to the attachment surface of each of the display device attachment portions 21 relative to a direction perpendicular to the second attachment surface of each of the unit attachment portions 23 allows for reducing vibrations transferred through the second attachment surface of each of the unit attachment portions 23.

Figure 18:
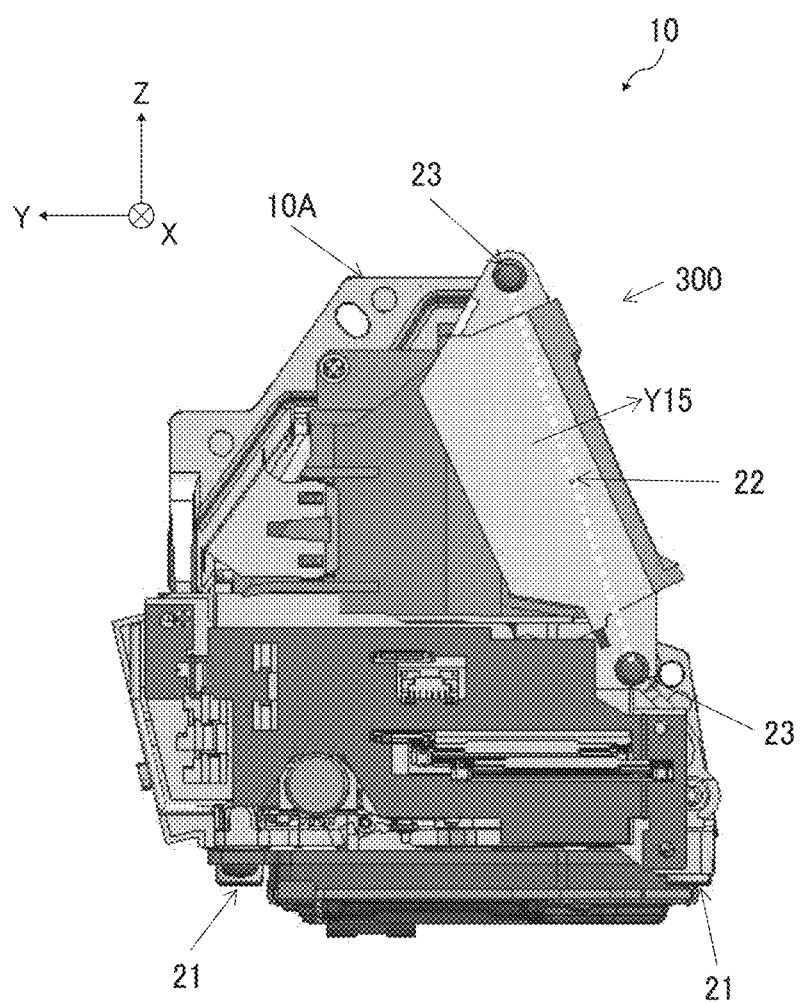
FIG. 18 is a side view of the display device according to an embodiment of the present disclosure.

FIG. 18 is a side view of the display device 10 according to the present embodiment as viewed from the rear side along the X-direction.

In the YZ plane, a center of the plurality of unit attachment portions 23 substantially matches the screen unit centroid 22. This allows the screen unit 300 to be supported with no moment being applied to the housing 10A, thereby reducing vibrations.

The screen unit 300 is attached to the housing 10A with a normal direction Y15 of the from surface of the screen 15 intersecting with both the Z-direction (vertical direction) and the X-direction (a front-and-rear direction of the mobile object 1A). In view of limitations of layout, an angle of the normal direction Y15 of the front surface of the screen 15 relative to the Z-direction (vertical direction) is preferably 45 degrees or more.

The normal direction Y15 of the front surface of the screen 15, which also intersects with a plane including the Z-direction (vertical direction) and the X-direction (the front-and-rear direction of the mobile object 1A), is substantially aligned with the Y-direction (the right-and-left direction of the mobile object 1A).

Figure 19:
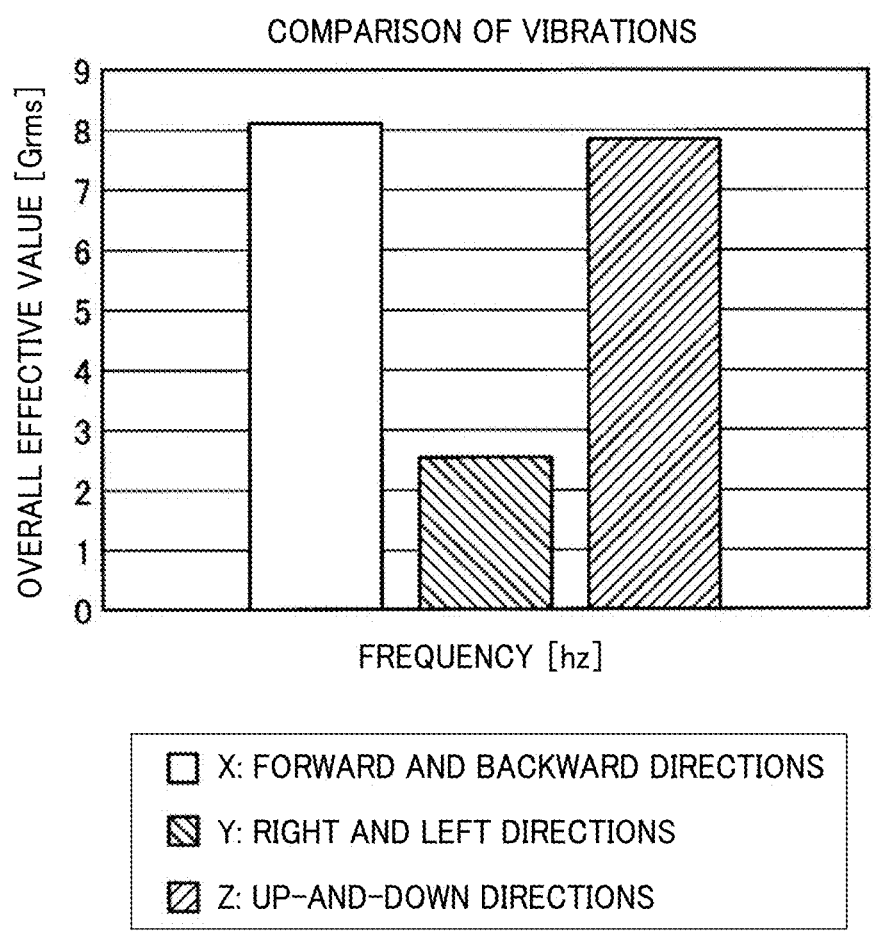
FIG. 19 is a view illustrating each of X-directional, Y-directional, and Z-directional overall effective values of attachment portions of the on-board device according to an embodiment of the present disclosure.

FIG. 19 illustrates each of X-directional, Y-directional, and Z-directional overall effective values of the attachment portions 41a to 41d of the on-board device 100 relative to the mobile object 1A. In FIG. 19, an abscissa axis represents frequencies (Hz) and an ordinate axis represents overall effective values. The overall effective values are each a value representing a magnitude of acceleration as a whole of a frequency range. A white bar graph in FIG. 19 represents an overall effective value of a vibration of the mobile object 1A along the front-and-rear direction (X-direction), a right-hatched bar graph represents an overall effective value of a vibration of the mobile object 1A along the right-and-left direction (Y-direction), and a left-hatched bar graph is an overall effective value of a vibration of the mobile object 1A along the up-and-down direction (gravity direction: Z-direction).

As is understood from FIG. 19, the overall effective value of the vibration of the mobile object 1A along the Y-direction (right-and-left direction) is smaller than the overall effective value along each of the X-direction (front-and-rear direction) and the Z-direction (gravity direction). This is because the X-direction and the Z-direction are directions where the mobile object 1A is to be influenced by road irregularities and a change in vehicle speed whereas the Y-direction is a direction where the mobile object 1A is unlikely to be influenced by road irregularities and a change in vehicle speed.

Meanwhile, the screen 15 includes the microlens array 200 as illustrated in FIG. 13. Although a positional displacement of the microlens array 200 in an in-plane direction has no influence on the display image, a positional displacement in a thickness direction (the normal direction of the front surface of the screen 15) Y15 changes an image forming position of the lens and thus has an influence.

Accordingly, in the present embodiment illustrated in FIG. 18, the normal direction Y15 of the front surface of the screen 15 intersects with both the Z-direction (vertical direction) and the X-direction (the front-and-rear direction of the mobile object 1A) while being substantially aligned with the Y-direction (the right-and-left direction of the mobile object 1A). This allows for reducing transmission of X-directional and Z-directional vibration components in the normal direction Y15 of the front surface of the screen 15, thereby reducing image disruption (flickering) even when disturbance such as vibrations occurs in the mobile object 1A.

Furthermore, the normal direction Y15 of the front surface of the screen 15, which also intersects with the plane including the Z-direction (vertical direction) and the X-direction (the front-and-rear direction of the mobile object 1A), is substantially aligned with the Y-direction (the right-and-left direction of the mobile object 1A). Thus, it is possible to reduce transmission of X-directional and Z-directional vibration components in the normal direction Y15 of the front surface of the screen 15, thereby reducing image disruption (flickering) even when disturbance such as vibrations occur in the mobile object 1A.

Figure 20:
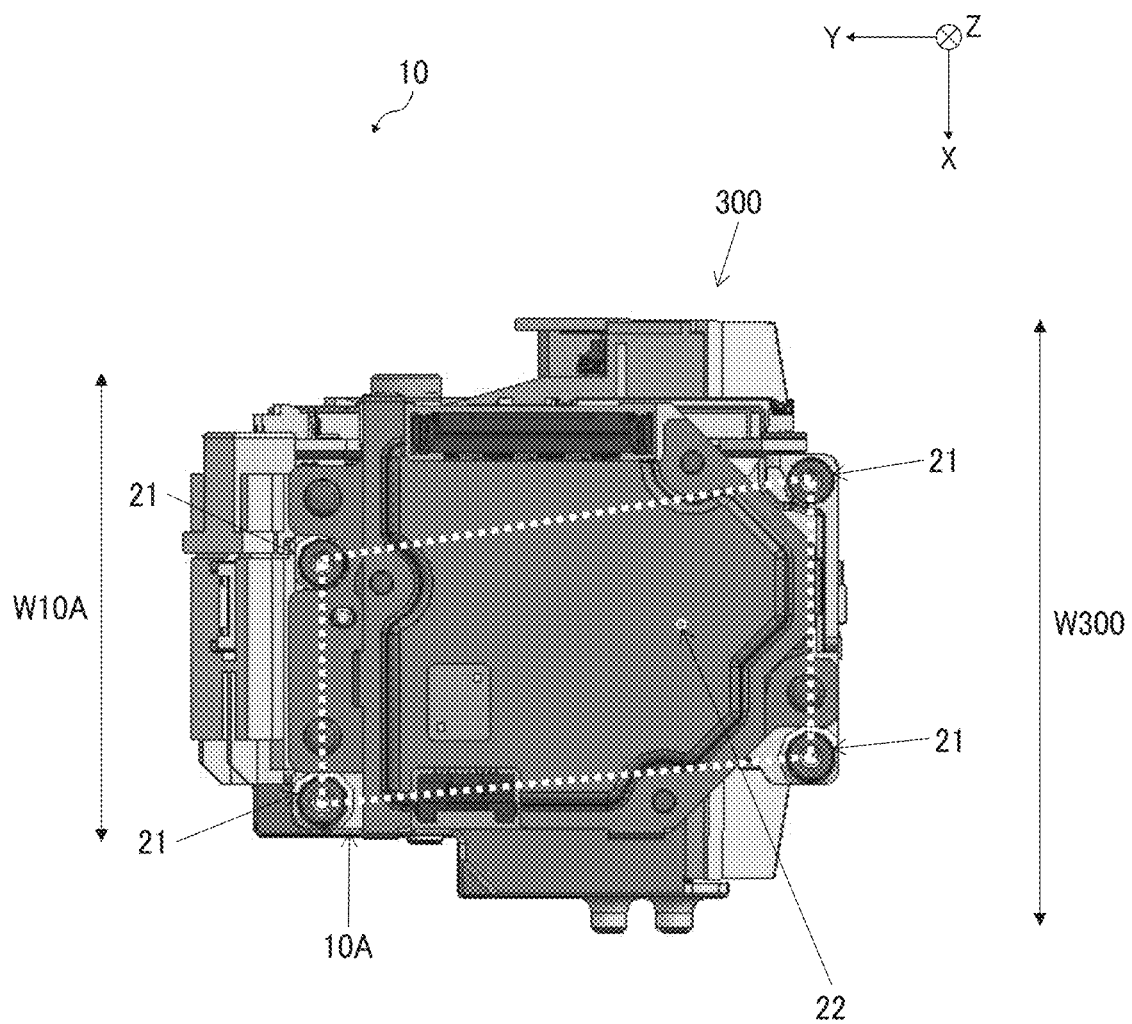
FIG. 20 is a bottom view of the display device according to an embodiment of the present disclosure.

FIG. 20 is a side view of the display device 10 according to the present embodiment as viewed from the bottom along the Z-direction.

In the XY plane, the screen unit 300 is attached to the housing 10A with the screen unit centroid 22 being located inside an area surrounded by the plurality of (four) display device attachment portions 21. The plurality of (four) display device attachment portions 21 are arranged on a bottom surface of the housing 10A at a point-to-point distance as large as possible.

This allows for preventing the housing 10A from shaking due to a moment applied to the housing 10A even when the width W10A of the housing 10A is smaller than the width W300 of the screen unit 300 along the X-axis direction, i.e., the main-scanning direction. Thus, it is possible to reduce image disruption (flickering) even when disturbance such as vibrations occurs in the mobile object 1A.

Furthermore, in the XY plane, the center (not illustrated) of the plurality of unit attachment portions 23 substantially matches the screen unit centroid 22. This allows the screen unit 300 to be supported with no moment being applied to the housing 10A to reduce vibrations.

Figure 21A:
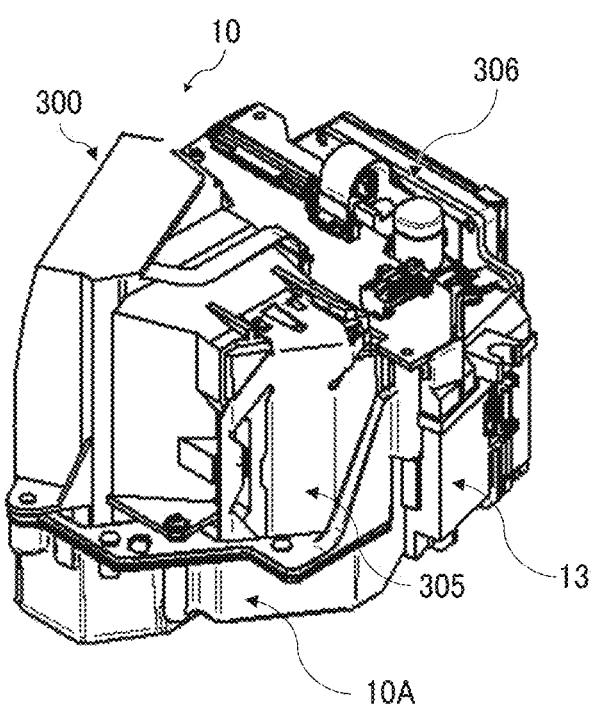
FIG. 21A is a perspective view of the display device according to an embodiment of the present disclosure.
Figure 21B:
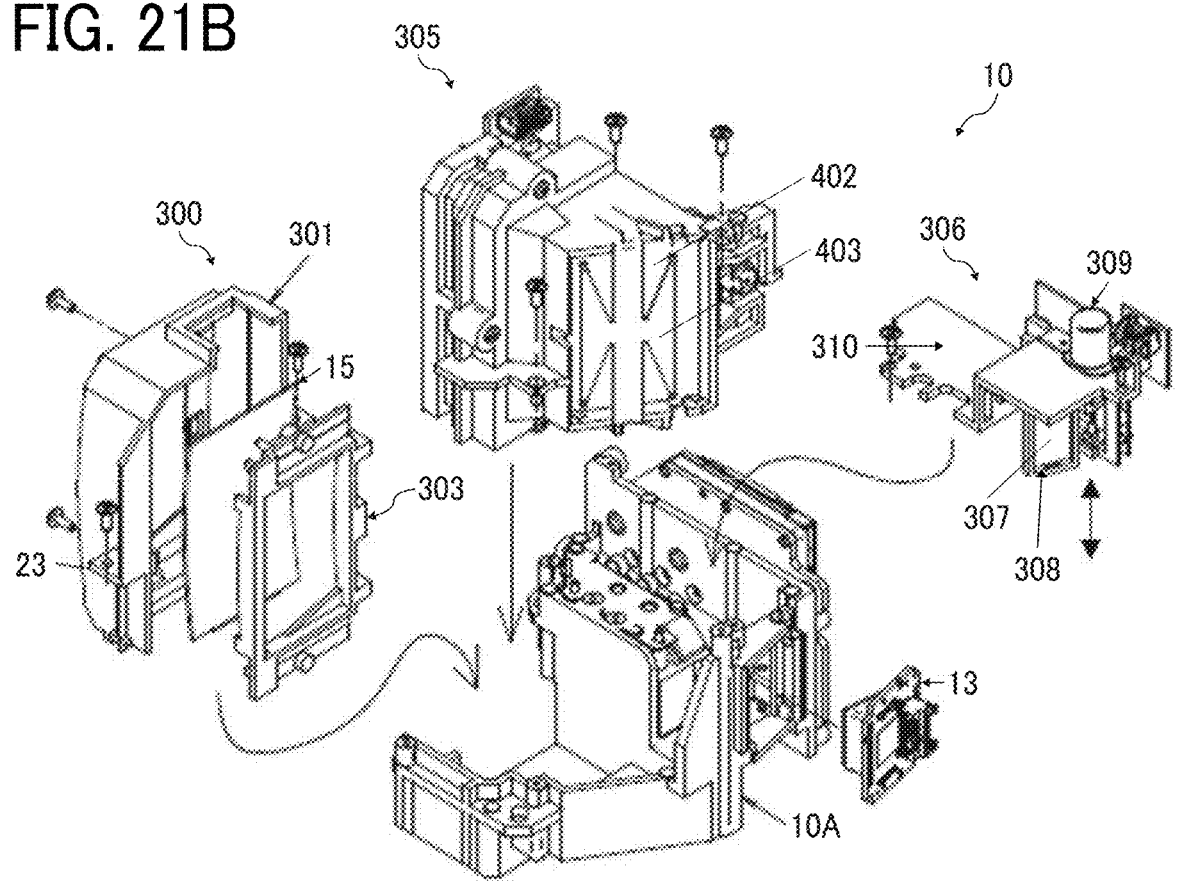
FIG. 21B is an exploded perspective view of the display device according to an embodiment of the present disclosure.

FIG. 21A is a perspective view of the display device 10 and FIG. 21B is an exploded perspective view of the display device 10.

The display device 10 includes an assembly of the housing 10A, the mirror unit 305, and the screen unit 300 as illustrated in FIG. 7. Additionally, the light deflector 13 and a dimmer unit 306 are removably attached to the housing 10A.

The screen unit 300 includes a first holding member 301 holding the screen 15 while facing the front surface of the screen 15 and a second holding member 303 holding the screen 15 while facing a rear surface of the screen 15. The first holding member 301 and the second holding member 303 are engaged with each other, sandwiching the screen 15. The plurality of (two) unit attachment portions 23 are provided on the first holding member 301. The first holding member 301 is attached to the housing 10A at the plurality of unit attachment portions 23.

The mirror unit 305 includes a flat spring 403 that biases the second mirror 402. The second mirror 402 is held with a reflection surface of the second mirror 402 being in contact with a contact surface defined in the mirror unit 305.

The dimmer unit 306 includes a filter holding member 308 holding the filter 307, a motor 309 that moves the filter holding member 308, and a cover member 310 that closes an upper surface of the housing 10A. The filter holding member 308, which is screwed to a lead thread formed on a shaft of the motor 309, is movable in an arrow direction in the figure. As the filter 307 moves with a movement of the filter holding member 308, the luminance of the light incident on the light deflector 13 is adjusted.

The light deflector 13 is bonded to an outer wall of the housing 10A with the mirror 130 illustrated in FIG. 12 being exposed through a rectangle hole of the housing 10A.

The display device 10, which is installed in the mobile object 1A, has a different curvature of the front windshield 50 depending on the type (vehicle type) of the mobile object 1A. Accordingly, the size, the location, and the angle of, for example, the screen 15 need to be finely adjusted. In the present embodiment, the units such as the screen unit 300 and the optical components such as the light deflector 13 are removably attached to, for example, the housing 10A, allowing the other components to be used in common for an improved productivity.

Figure 22:
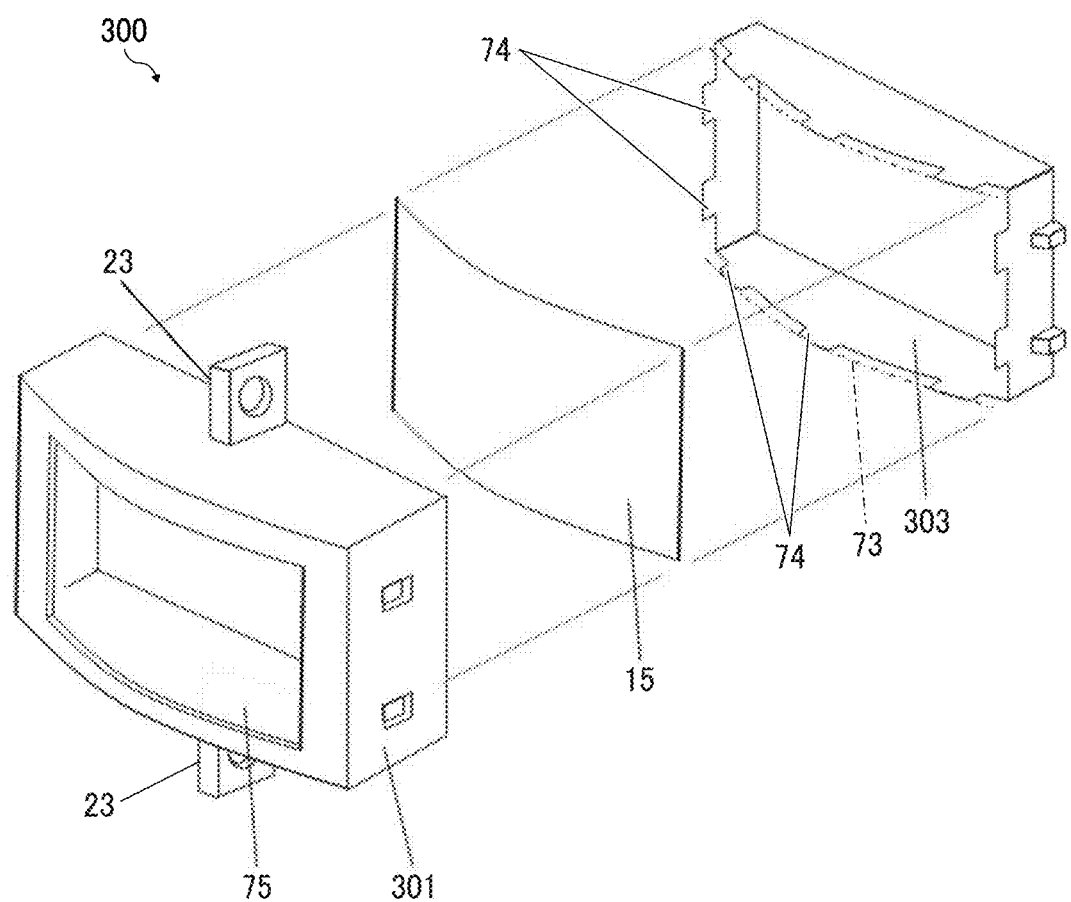
FIG. 22 is an exploded perspective view of the screen unit according to an embodiment of the present disclosure.

FIG. 22 is an exploded view of the screen unit 300.

As described with reference to FIG. 8, sunlight applied to the front windshield 50 sometimes reaches at least one of the screen 15 or the screen unit 300 as inversely travelling along the light path. The present embodiment has an object to reduce deterioration of the image quality as a result of the screen 15 being deformed or discolored by the heat of the sunlight.

The first holding member 301 has an opening window 75 for outputting the image light diverging through the screen 15.

The second holding member 303, which is in the form of a box frame, includes a plurality of protrusions 74 to be in contact with the screen 15. Some of the plurality of protrusions 74 are formed along an arc-shaped member 73 that is brought into contact with a periphery of an image displayed portion of the screen 15 to correct a shape of the screen 15 into an arc shape.

The screen 15, which may be curved or flattened, is curved in the present embodiment. The screen 15, which is formed from the resin thin plate, is flexible and thus held in an arc shape as sandwiched between the first holding member 301 and the second holding member 303 to be in contact with the plurality of protrusions 74.

The first holding member 301 is formed from a metal and the second holding member 303 is formed from a resin. The plurality of (two) unit attachment portions 23 to be attached to the housing 10A are provided on the first holding member 301 with a higher thermal conductivity. This facilitates release of the heat of the screen 15 and the screen unit 300 to the housing 10A as compared with a case where the unit attachment portions 23 are provided on the second holding member 303 with a lower thermal conductivity.

Furthermore, the housing 10A is formed by aluminum die-casting and the thermal conductivity of the first holding member 301 is the same as the thermal conductivity of the housing 10A. This allows for effectively reducing temperature deviation as a whole of the display device 10.

Moreover, a thermal conductivity of a bonded interface of each of the unit attachment portions 23 is comparable to or lower than the thermal conductivity of the second holding member 303. This allows for efficiently transferring the heat to the housing 10A.

Figure 23:
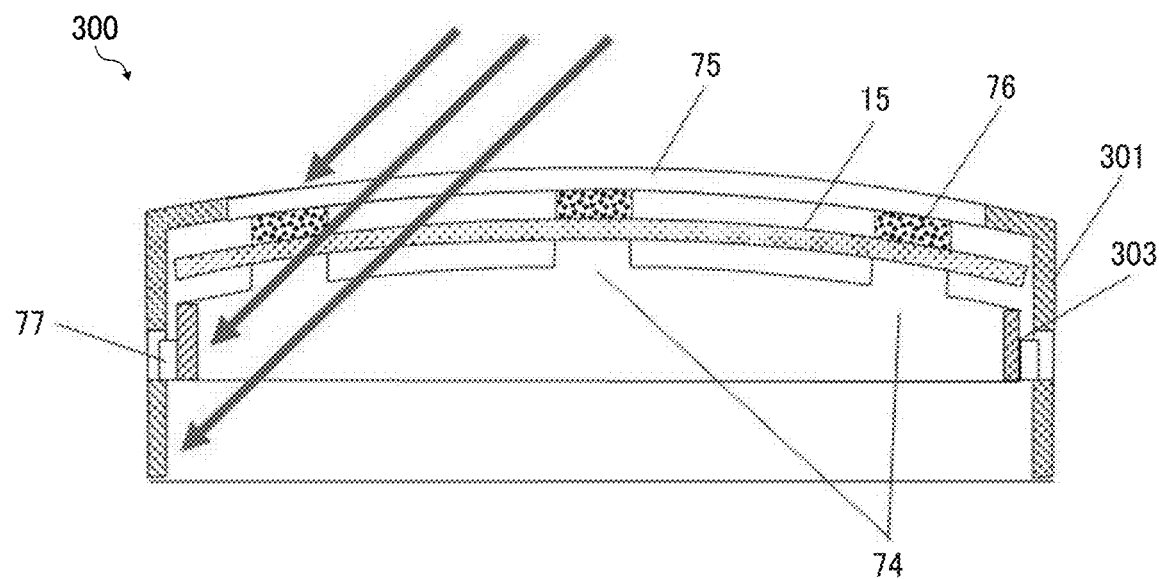
FIG. 23 is a cross-sectional view of the screen unit according to an embodiment of the present disclosure.

FIG. 23 is a cross-sectional view of the screen unit 300.

Elastic members 76 are stuck on the first holding member 301, facing the plurality of protrusions 74 of the second holding member 303. For example, the elastic members 76 are formed from a flexible silicone rubber with a relatively high thermal conductivity.

When the second holding member 303 is fitted inside the first holding member 301, protruding portions 77 provided on the second holding member 303 are engaged with the first holding member 301. The screen 15 is sandwiched between the plurality of protrusions 74 of the second holding member 303 and the elastic members 76 of the first holding member 301, thereby being reliably in contact with the plurality of protrusions 74 as pressed by the elastic members 76. The shape of the screen 15 is thus corrected into an arc shape with a desired curvature.

Figure 24:
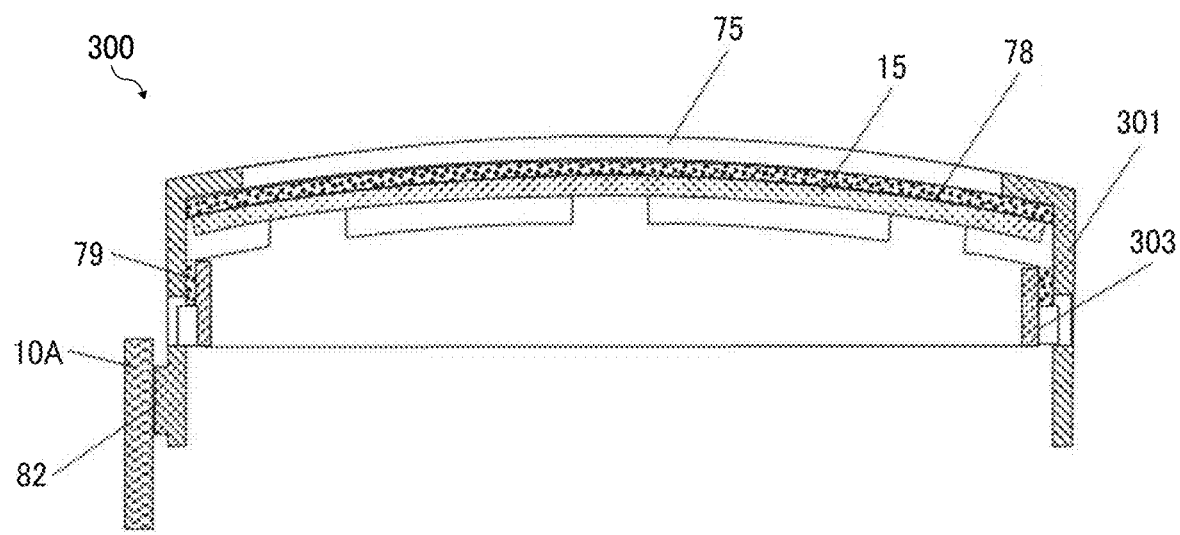
FIG. 24 is a cross-sectional view of a modification example of the screen unit according to an embodiment of the present disclosure.

FIG. 24 is a cross-sectional view of a modification example of the screen unit 300.

The first holding member 301 includes a heat radiating member 82 that is brought into direct contact with the housing 10A in addition to the unit attachment portions 23.

The screen unit 300 also includes a heat conductive member 79 disposed between the first holding member 301 and the second holding member 303 to lower a thermal resistance and a sponge 78 disposed between the screen 15 and the first holding member 301 to provide a thermal resistance. The first holding member 301 and the second holding member 303 may be in direct contact with each other.

This allows for reducing the thermal resistance between the first holding member 301 and the housing 10A with respect to the thermal resistance between the screen 15 and the first holding member 301 for a reduction in heat transfer to the screen 15.

Similarly, the heat resistance between the first holding member 301 and the second holding member 303 is allowed to be reduced with respect to the heat resistance between the screen 15 and the first holding member 301. This allows for reducing heat transfer to the screen 15.

Furthermore, the plurality of protrusions 74 of the second holding member 303 allow for extremely reducing a contact area relative to the screen 15 for a reduction in heat transfer to the screen 15.

It should be noted that although the display device, the display system, and the mobile object according to the present embodiment of the present invention have been described, the present invention is by no means limited to the above-described embodiment and may be modified within a scope obvious to those skilled in the art.

Furthermore, the display device according to the present embodiment of the present invention is not limited to a HUD device but may be, for example, a head mount display, a prompter display, or a projector device. For example, in a case where the display device according to the present embodiment of the present invention is used as a projector device, the projector device may be configured in the same manner as the display device 10. In other words, the display device 10 may project image light to a projection screen, a wall surface, or the like via the free-form mirror 30. It should be noted that the display device 10 may project image light to a projection screen, a wall surface, or the like via not the free-form mirror 30 but the screen 15.

According to one aspect of the present disclosure, it is possible to provide a display device and a mobile object configured to reduce disruption of an image quality. According to another aspect of the present disclosure, a display device and a mobile object in which the image quality is improved and the footprint is reduced can be provided.

Numerous additional modifications and variations are possible in light of the above teachings. It is therefore to be understood that within the scope of the appended claims, the disclosure of the present disclosure may be practiced otherwise than as specifically described herein. For example, elements and/or features of different illustrative embodiments may be combined with each other and/or substituted for each other within the scope of this disclosure and appended claims.

What is claimed is:

1. A display device installable in a mobile object, the display device comprising:
    a light source;
    an image former configured to receive light emitted from the light source and output image light that forms an image;
    a screen on which the image light forms the image;
    a housing that houses the light source and the image former; and
    a holder that holds the screen, wherein
    the holder, holding the screen, is removably attachable to and detachable from the housing, and
    in a case that the holder is attached to the housing, a normal direction of a surface of the screen intersects with a vertical direction and with a front-and-rear direction of the mobile object.

2. The display device according to claim 1, wherein in a case that the holder is attached to the housing, the normal direction of the surface of the screen intersects with a plane including the vertical direction and the front-and-rear direction of the mobile object.

3. The display device according to claim 2, wherein in a case that the holder is attached to the housing, the normal direction of the surface of the screen is aligned with a right-and-left direction of the mobile object.

4. A mobile object, comprising:
    the display device according to claim 1;
    a front windshield that reflects the image light; and
    an image-forming optical system configured to project the image light projected from the screen toward the front windshield, wherein
    the screen, through which the image light diverges, projects the image light.

5. The display device according to claim 1, wherein the holder includes a first holder and a second holder that are engaged with each other to sandwich the screen.

6. The display device according to claim 5, wherein the first holder is removably attached to and detachable from the housing to attach and detach the holder to and from the housing.

7. The display device according to claim 5, wherein the first holder includes an opening window for the screen.

8. The display device according to claim 5, wherein the first holder is composed from a metal and the second holder is composed of a resin.

9. The display device according to claim 5, wherein elastic members are attached to the first holder and face protrusions of the second holder to engage the first holder with the second holder.

10. A display device installable in a mobile object, the display device comprising:
    a light source;
    an image former configured to receive light emitted from the light source and output image light that forms an image;
    a screen on which the image light forms the image;
    a housing that houses the light source and the image former; and
    a holder that holds the screen, wherein
    a width of the housing is narrower than a width of the holder, and
    the holder, holding the screen, is removably attachable to and detachable from the housing.

11. The display device according to claim 10, wherein
    the image former is configured to scan the image light two-dimensionally in a main scanning direction and a sub-scanning direction to form the image, and
    the width of the housing is narrower than the width of the holder in the main scanning direction.

12. The display device according to claim 11, wherein the holder is removably attachable to the housing at both ends in the sub-scanning direction.

13. The display device according to claim 10, further comprising:
    a plurality of attachment portions attached to an installation portion, wherein
    the holder is removably attached to the housing with a centroid being located inside an area surrounded by the plurality of attachment portions.

14. The display device according to claim 13, wherein when the holder is disposed, a second attachment surface attached to the housing is inclined with respect to a first attachment surface through which the display device is attached to the installation portion.

15. A mobile object, comprising:
    the display device according to claim 10;
    a front windshield that reflects the image light; and
    an image-forming optical system configured to project the image light projected from the screen toward the front windshield, wherein
    the screen through which the image light diverges projects the image light.

16. The display device according to claim 10, wherein the holder includes a first holder and a second holder that are engaged with each other to sandwich the screen.

17. The display device according to claim 16, wherein the first holder is removably attached to and detachable from the housing to attach and detach the holder to and from the housing.

18. The display device according to claim 16, wherein the first holder includes an opening window for the screen.

19. The display device according to claim 16, wherein the first holder is composed from a metal and the second holder is composed of a resin.

20. The display device according to claim 16, wherein elastic members are attached to the first holder and face protrusions of the second holder to engage the first holder with the second holder.

* * * * *